(12) United States Patent
Wu

(10) Patent No.: US 12,262,112 B2
(45) Date of Patent: Mar. 25, 2025

(54) SHOOTING METHOD OF TIME-LAPSE PHOTOGRAPHY AND DEVICE

(71) Applicant: Huawei Technologies Co., Ltd., Shenzhen (CN)

(72) Inventor: Lei Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/007,402

(22) PCT Filed: Mar. 16, 2021

(86) PCT No.: PCT/CN2021/081182
§ 371 (c)(1),
(2) Date: May 31, 2023

(87) PCT Pub. No.: WO2021/244104
PCT Pub. Date: Dec. 9, 2021

(65) Prior Publication Data
US 2024/0305880 A1    Sep. 12, 2024

(30) Foreign Application Priority Data
May 30, 2020 (CN) .......................... 202010482077.2

(51) Int. Cl.
| | |
|---|---|
| *H04N 5/335* | (2011.01) |
| *H04N 5/91* | (2006.01) |
| *H04N 23/60* | (2023.01) |
| *H04N 23/63* | (2023.01) |
| *H04N 23/667* | (2023.01) |
| *H04N 23/69* | (2023.01) |

(52) U.S. Cl.
CPC ............. *H04N 23/635* (2023.01); *H04N 5/91* (2013.01); *H04N 23/632* (2023.01); *H04N 23/64* (2023.01); *H04N 23/667* (2023.01); *H04N 23/69* (2023.01)

(58) Field of Classification Search
CPC .................................................... H04N 23/667
See application file for complete search history.

(56) References Cited

U.S. PATENT DOCUMENTS

2015/0049217 A1* 2/2015 Takahashi ............ H04N 5/2621
348/333.03

FOREIGN PATENT DOCUMENTS

| | | | |
|---|---|---|---|
| CN | 104378547 A | | 2/2015 |
| JP | 2015061234 A | * | 3/2015 |
| JP | 2019022026 A | | 2/2019 |

* cited by examiner

*Primary Examiner* — Gary C Vieaux
(74) *Attorney, Agent, or Firm* — Conley Rose, P.C.

(57) ABSTRACT

A shooting method of time-lapse photography, so that a shooting range can be automatically adjusted in a shooting process of time-lapse photography without using a guide rail or manually adjusting the shooting range by a user in real time, thereby facilitating shooting of time-lapse photography. The shooting method includes displaying on a preview interface, a preview image and a first window displaying recorded images obtained based on a capture interval and the first window, wherein positions of the first window on different recorded images are different, and stopping shooting after the first window reaches a boundary of a recorded image.

20 Claims, 30 Drawing Sheets

SHOOTING METHOD OF TIME-LAPSE PHOTOGRAPHY AND DEVICE

CROSS-REFERENCE TO RELATED APPLICATIONS

This is a national stage of International Patent Application No. PCT/CN2021/081182 filed on Mar. 16, 2021, which claims priority to Chinese Patent Application No. 202010482077.2 filed on May 30, 2020. Both of the aforementioned applications are hereby incorporated by reference in their entireties.

TECHNICAL FIELD

Embodiments of this application relate to the field of electronic technologies, and in particular, to a shooting method of time-lapse photography and a device.

BACKGROUND

Time-lapse photography can play content taken in a long period of time as a video in a short period of time. Currently, when an electronic device is used to shoot time-lapse photography, a user may move the electronic device and a lens by using a component such as a guide rail, to change a shooting range in a time-lapse photography process; or in a shooting process, the user manually adjusts the lens every time one image is shot, to adjust the shooting range in real time. However, it is inconvenient for the user to perform long-time shooting of time-lapse photography by using another component or frequent manual operations of the user, and shooting experience of the user is poor.

SUMMARY

Embodiments of this application provide a shooting method of time-lapse photography and a device, so that a shooting range can be automatically adjusted in a shooting process of time-lapse photography without using a guide rail or manually adjusting the shooting range by a user in real time, so that it can be convenient for the user to shoot time-lapse photography, thereby improving shooting experience of the user.

To achieve the foregoing objective, the following technical solutions are used in embodiments of this application.

According to an aspect, embodiments of this application provide a shooting method, including: An electronic device enters a time-lapse photography mode of a camera application. The electronic device enters a first submode of the time-lapse photography mode in response to a first preset operation of a user. The electronic device displays a preview image and a first window on a preview interface, where a size ratio of the first window is consistent with that of the preview image. The electronic device displays, on a shooting interface in response to a shooting operation of the user, recorded images obtained based on a capture interval and the first window, where positions of the first window on different recorded images are different. The electronic device stops shooting after the first window reaches a boundary of a recorded image, and generates a time-lapse photography video, where video images in the time-lapse photography video include images in the first window on the recorded images.

In this solution, in a shooting process of time-lapse photography, the electronic device may automatically adjust the position of the first window, to automatically determine a field of view range of a target image in the first window, and automatically adjust a to-be-recorded shooting range of a video without using an external apparatus such as a guide rail to perform an operation such as panning on a lens and without manually adjusting the shooting range by the user in real time. This can help the user shoot a scene in which a to-be-shot range moves, to provide the user with dynamic video experience in which a field of view range constantly moves.

In a possible design, that the electronic device displays a preview image and a first window on a preview interface includes: The electronic device displays the preview image on the preview interface. The electronic device displays the first window on the preview interface in response to a second preset operation of the user.

In other words, the electronic device may display the first window on the preview interface after detecting the second preset operation of the user, or otherwise temporarily does not automatically display the first window.

In another possible design, the preview interface includes a plurality of direction controls, and the method further includes: The electronic device detects an operation of the user on a target direction control, and determines a direction indicated by the target direction control as a target direction; and moves the first window in the target direction on adjacent recorded images.

In other words, the electronic device may determine the target direction based on a setting operation of the user, to move the first window in the target direction in the shooting process.

In another possible design, the preview interface includes a moving speed adjustment control, and the method further includes: The electronic device detects an operation of the user on the moving speed adjustment control, and determines a target speed corresponding to the moving speed adjustment control; and moves the first window in the target direction on the adjacent recorded images at the target speed.

In other words, the electronic device may determine the target speed based on a setting operation of the user, to move the first window in the shooting process at the target speed.

In another possible design, the method further includes: The electronic device displays the video images in the time-lapse photography video on a play interface after a play operation of the user is detected, where the video images include the images in the first window on the recorded images, and sizes of the video images are consistent with a size of the preview image.

In this solution, the electronic device may record images in the first window in the shooting process, and play the images as a video.

In another possible design, on the first recorded image in a shooting process, a horizontal coordinate of a first vertex of the first window is x1; after the first window moves to the boundary of the recorded image in the target direction, the horizontal coordinate of the first vertex is x1e; and on the $m^{th}$ recorded image in the shooting process, the horizontal coordinate of the first vertex is x1m, and x1m=x1+(x1e−x1)*v*(m−1), where v represents the target speed, that is, a quantity of pixels that a vertex coordinate of the first window moves on two adjacent frames of recorded image.

In this way, the electronic device may calculate the vertex coordinate of the first window in the shooting process in this manner, to move the first window based on the coordinate.

According to another aspect, embodiments of this application provide another shooting method, including: An electronic device enters a time-lapse photography mode of a camera application. The electronic device enters a second submode of the time-lapse photography mode in response to a third preset operation of a user. The electronic device displays a first preview image and first relative position information on a preview interface, where the first relative position information includes a relative position relationship among a start box, a target box, and a maximum range box. The start box corresponds to a start field of view range, the first preview image corresponds to the start field of view range, the target box corresponds to a target field of view range, and the maximum range box corresponds to a maximum field of view range. The electronic device displays, on a shooting interface in response to a shooting operation of the user, recorded images obtained based on a capture interval, and changes field of view ranges of different recorded images from the start field of view range to the target field of view range, where sizes of the recorded images are consistent with a size of the first preview image. The electronic device stops shooting after a field of view range of a recorded image has changed to the target field of view range, and generates a time-lapse photography video, where video images in the time-lapse photography video include the recorded images.

In this solution, in a shooting process of time-lapse photography, the electronic device may automatically adjust a field of view range of a target image based on the target field of view range, to automatically adjust a to-be-recorded shooting range of a video without using an external apparatus such as a guide rail to perform an operation such as tracking on a lens and without manually adjusting the shooting range by the user in real time. This can help the user shoot a scene in which a to-be-shot range requires zooming in/out, to provide the user with dynamic video experience in which a size of a field of view range constantly changes.

The target box is larger than or smaller than the start box. To be specific, the target field of view range may be larger than the start field of view range, or may be smaller than the start field of view range.

In a possible design, that the electronic device displays first relative position information on a preview interface includes: The electronic device displays second relative position information on the preview interface, where the second relative position information includes a relative position relationship between the start box and the maximum range box. The electronic device adjusts a zoom ratio of the first preview image in response to a fourth preset operation of the user, where a field of view range that is on the preview interface and corresponds to the second preview image obtained after the adjustment is the target field of view range. The electronic device displays the first relative position information on the preview interface.

In other words, on the preview interface, instead of automatically displaying the target box first, the electronic device may display the target box after detecting the fourth preset operation of the user.

In another possible design, the preview interface includes a zoom in/out speed adjustment control, and the method further includes: The electronic device detects an operation of the user on the zoom in/out speed adjustment control, and determines a target speed corresponding to the zoom in/out speed adjustment control. Field of view ranges of different recorded images change from the start field of view range to the target field of view range at the target speed.

In this way, the electronic device may adjust the field of view ranges of the recorded images in the shooting process at the target speed set by the user.

In another possible design, the shooting interface further includes third relative position information, the third relative position information includes a relative position relationship among a recording box, the target box, and the maximum range box, and the recording box corresponds to a field of view range of the recorded image.

In this solution, in the shooting process, the electronic device may prompt the user with a current shooting progress, a relative position, or the like by using the third relative position information.

In another possible design, the method further includes: The electronic device displays the video images in the time-lapse photography video on a play interface after a play operation of the user is detected, where the video images include the recorded images.

In this solution, the electronic device may record recorded images with a field of view range constantly changing in the shooting process, and play the recorded images as a video.

In another possible design, a horizontal coordinate of a first vertex on the first recorded image corresponding to the start field of view range in a shooting process is x1, the horizontal coordinate of the first vertex of an image region corresponding to the target field of view range in the first recorded image is x1e, the horizontal coordinate of the first vertex on the $m^{th}$ recorded image in the shooting process is x1m, and if an area of an image region corresponding to the start field of view range is S1 pixels and an area of the image region corresponding to the target field of view range is S2 pixels, $x1m=x1+(x1e-x1)*c*(m-1)$, where $c=(S2-S1)/v$, and \ represents the target speed, that is, a quantity of pixels that a coordinate of a same vertex moves on two adjacent frames of recorded image.

In this way, the electronic device may calculate, in this manner, a vertex coordinate of a field of view range constantly changing in the shooting process, to determine a range of recorded images based on the coordinate.

According to another aspect, embodiments of this application further provide an electronic device, including: a camera, configured to capture an image; a screen, configured to display an interface; one or more processors; a memory; and one or more computer programs, where the one or more computer programs are stored in the memory, the one or more computer programs include instructions, and when the instructions are executed by the electronic device, the electronic device is enabled to perform the following steps: entering a time-lapse photography mode of a camera application; entering a first submode of the time-lapse photography mode in response to a first preset operation of a user; displaying a preview image and a first window on a preview interface, where a size ratio of the first window is consistent with that of the preview image, displaying, on a shooting interface in response to a shooting operation of the user, recorded images obtained based on a capture interval and the first window, where positions of the first window on different recorded images are different; and stopping shooting after the first window reaches a boundary of a recorded image, and generating a time-lapse photography video, where video images in the time-lapse photography video include images in the first window on the recorded images.

In a possible design, the displaying a preview image and a first window on a preview interface includes: displaying the preview image on the preview interface; and displaying the first window on the preview interface in response to a second preset operation of the user.

In another possible design, the preview interface includes a plurality of direction controls, and when the instructions are executed by the electronic device, the electronic device is enabled to perform the following steps: detecting an operation of the user on a target direction control, and determining a direction indicated by the target direction control as a target direction; and moving the first window in the target direction on adjacent recorded images.

In another possible design, the preview interface includes a moving speed adjustment control, and when the instructions are executed by the electronic device, the electronic device is further enabled to perform the following steps: detecting an operation of the user on the moving speed adjustment control, and determining a target speed corresponding to the moving speed adjustment control; and moving the first window in the target direction on the adjacent recorded images at the target speed.

According to another aspect, embodiments of this application provide an electronic device, including: a camera, configured to capture an image; a screen, configured to display an interface; one or more processors; a memory; and one or more computer programs. The one or more computer programs are stored in the memory, and the one or more computer programs include instructions. When the instructions are executed by the electronic device, the electronic device is enabled to perform the following steps: entering a time-lapse photography mode of a camera application; entering a second submode of the time-lapse photography mode in response to a third preset operation of a user; displaying a first preview image and first relative position information on a preview interface, where the first relative position information includes a relative position relationship among a start box, a target box, and a maximum range box, the start box corresponds to a start field of view range, the first preview image corresponds to the start field of view range, the target box corresponds to a target field of view range, and the maximum range box corresponds to a maximum field of view range; displaying, on a shooting interface in response to a shooting operation of the user, recorded images obtained based on a capture interval, and changing field of view ranges of different recorded images from the start field of view range to the target field of view range, where sizes of the recorded images are consistent with a size of the first preview image; and stopping shooting after a field of view range of a recorded image has changed to the target field of view range, and generating a time-lapse photography video, where video images in the time-lapse photography video include the recorded images.

In a possible design, the displaying first relative position information on a preview interface includes: displaying second relative position information on the preview interface, where the second relative position information includes a relative position relationship between the start box and the maximum range box; adjusting a zoom ratio of the first preview image in response to a fourth preset operation of the user, where a field of view range that is on the preview interface and corresponds to the second preview image obtained after the adjustment is the target field of view range; and displaying the first relative position information on the preview interface.

In another possible design, the preview interface includes a zoom in/out speed adjustment control, and when the instructions are executed by the electronic device, the electronic device is further enabled to perform the following steps: detecting an operation of the user on the zoom in/out speed adjustment control, and determining a target speed corresponding to the zoom in/out speed adjustment control; and changing field of view ranges of different recorded images from the start field of view range to the target field of view range at the target speed.

In another possible design, the shooting interface further includes third relative position information, the third relative position information includes a relative position relationship among a recording box, the target box, and the maximum range box, and the recording box corresponds to a field of view range of the recorded image.

According to another aspect, embodiments of this application provide a shooting apparatus. The apparatus is included in an electronic device. The apparatus has a function of implementing behavior of the electronic device in any method in the foregoing aspects and the possible designs, so that the electronic device performs the shooting method performed by the electronic device in any possible design of the foregoing aspects. The function may be implemented by hardware, or may be implemented by hardware executing corresponding software. The hardware or the software includes at least one module or unit corresponding to the foregoing function. For example, the apparatus may include a processing unit, a display unit, a detection unit, and the like.

According to still another aspect, embodiments of this application provide an electronic device, including: a camera, configured to capture an image; a screen, configured to display an interface; one or more processors; and a memory. The memory stores code. When the code is executed by the electronic device, the electronic device is enabled to perform the shooting method performed by the electronic device in any possible design of the foregoing aspects.

According to still another aspect, embodiments of this application provide an electronic device, including one or more processors and a memory. The memory stores code. When the code is executed by the electronic device, the electronic device is enabled to perform the shooting method performed by the electronic device in any possible design of the foregoing aspects.

According to another aspect, embodiments of this application provide a computer-readable storage medium, including computer instructions. When the computer instructions are run on an electronic device, the electronic device is enabled to perform the shooting method in any possible design of the foregoing aspects.

According to still another aspect, embodiments of this application provide a computer program product. When the computer program product is run on a computer, the computer is enabled to perform the shooting method performed by the electronic device in any possible design of the foregoing aspects.

According to another aspect, embodiments of this application provide a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the shooting method in any possible design of the foregoing aspects.

For beneficial effects corresponding to the other aspects, refer to descriptions of beneficial effects in the method aspects. Details are not described herein again.

DESCRIPTION OF EMBODIMENTS

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example. A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In descriptions of embodiments, unless otherwise stated, "a plurality of" means two or more than two.

Time-lapse photography can compress a slow change process of a shot object or scenery into a short period of time and play the slow change process as a video. For example, time-lapse photography may be used to shoot a plurality of scenes such as natural scenery (for example, cloud change, sunrise and sunset, flower opening and falling, starry sky, and the Milky Way), urban scenery, urban life, astronomical phenomena (for example, eclipse), building manufacturing, or biological evolution (for example, cell division and egg hatching).

Embodiments of this application provide a shooting method of time-lapse photography and may be used in an electronic device, so that a shooting range can be automatically adjusted in a shooting process of time-lapse photography without using a heavy external auxiliary device such as a guide rail and without frequently manually adjusting the shooting range by a user in the shooting process, so that it can be convenient for the user to shoot time-lapse photography, thereby improving shooting experience of the user.

For example, the electronic device may be a mobile terminal such as a mobile phone, a tablet computer, a wearable device, a vehicle-mounted device, an augmented reality (augmented reality. AR)/virtual reality (virtual reality, VR) device, a notebook computer, an ultra-mobile personal computer (ultra-mobile personal computer. UMPC), a netbook, or a personal digital assistant (personal digital assistant. PDA), or may be a device such as a professional camera. A specific type of the electronic device is not limited in embodiments of this application.

Figure 1:
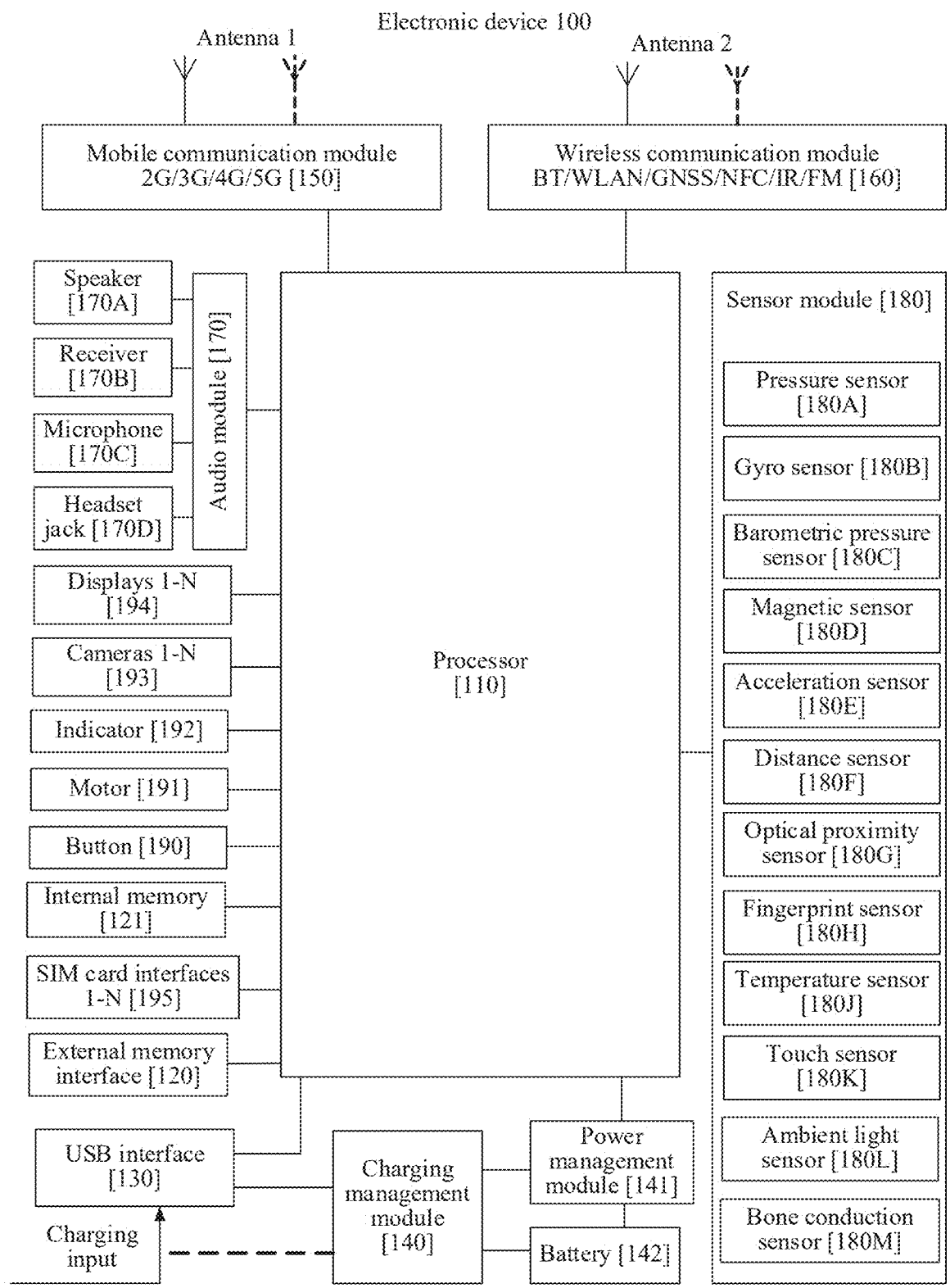
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit. NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode. QLED), or the like. In some embodiments, the electronic device 100 may include one or N displays 194, where N is a positive integer greater than 1. For example, the display 194 may be configured to display a preview interface and a shooting interface in a time-lapse photography mode, a play interface of a time-lapse photography video, and the like.

The electronic device 100 can implement a shooting function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The camera 193 may further include a plurality of types. For example, the camera 193 may include a long-focus camera, a wide-angle camera, an ultra-wide-angle camera, or the like that has different focal lengths. The long-focus camera has a small field of view, and is suitable for shooting scenery in a small distant range. The wide-angle camera has a large field of view. The ultra-wide-angle camera has a larger field of view than the wide-angle camera, and may be used to shoot a picture in a large range such as a panorama. In some embodiments, a long-focus camera with a small field of view may rotate, so that scenery in different ranges can be shot.

In embodiments of this application, an original image may be generated after an image captured by the camera 193 is processed by the ISP and the like.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

In embodiments of this application, the processor 110 may run the instructions stored in the internal memory 121, to continuously determine coordinates of vertices of a target image in a movement submode or a zoom in/out submode of time-lapse photography, to determine the target image in an area framed by the vertices, and further generate a time-lapse photography video based on the target image.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a position different from a position of the display 194.

It may be understood that the structure shown in embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

In embodiments of this application, in the time-lapse photography mode, the camera 193 may capture an image with a large field of view range, to generate an original image. The processor 110 may run the instructions stored in the internal memory 121, to automatically determine coordinates of vertices of a target image on the original image in a movement submode or a zoom in/out submode of time-lapse photography, to determine the target image in an area framed by the vertices, and further generate a time-lapse photography video based on the target image. In this way, a region in which the target image is located and a corresponding shooting range (or referred to as a field of view range) may automatically change without using a heavy device such as an external guide rail and without real-time adjustment of the shooting range by a user in a shooting process. The display 194 may be configured to display a preview interface and a shooting interface in a time-lapse photography mode, a play interface of a time-lapse photography video, and the like.

The following describes the shooting method provided in embodiments of this application by using an example in which the electronic device is a mobile phone and a screen of the mobile phone is the foregoing touchscreen.

Figure 2:
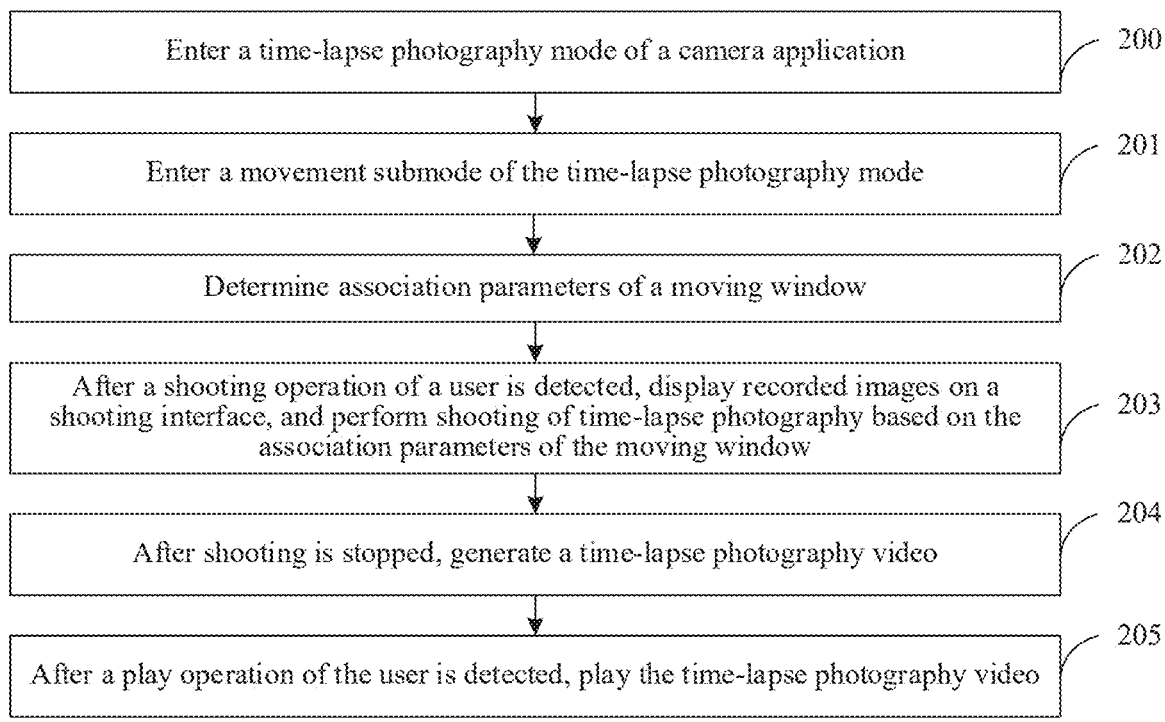
FIG. 2 is a flowchart of a shooting method according to an embodiment of this application.

Referring to FIG. 2, an embodiment of this application provides a shooting method of time-lapse photography, including the following steps.

200: A mobile phone enters a time-lapse photography mode of a camera application.

Figure 3A:
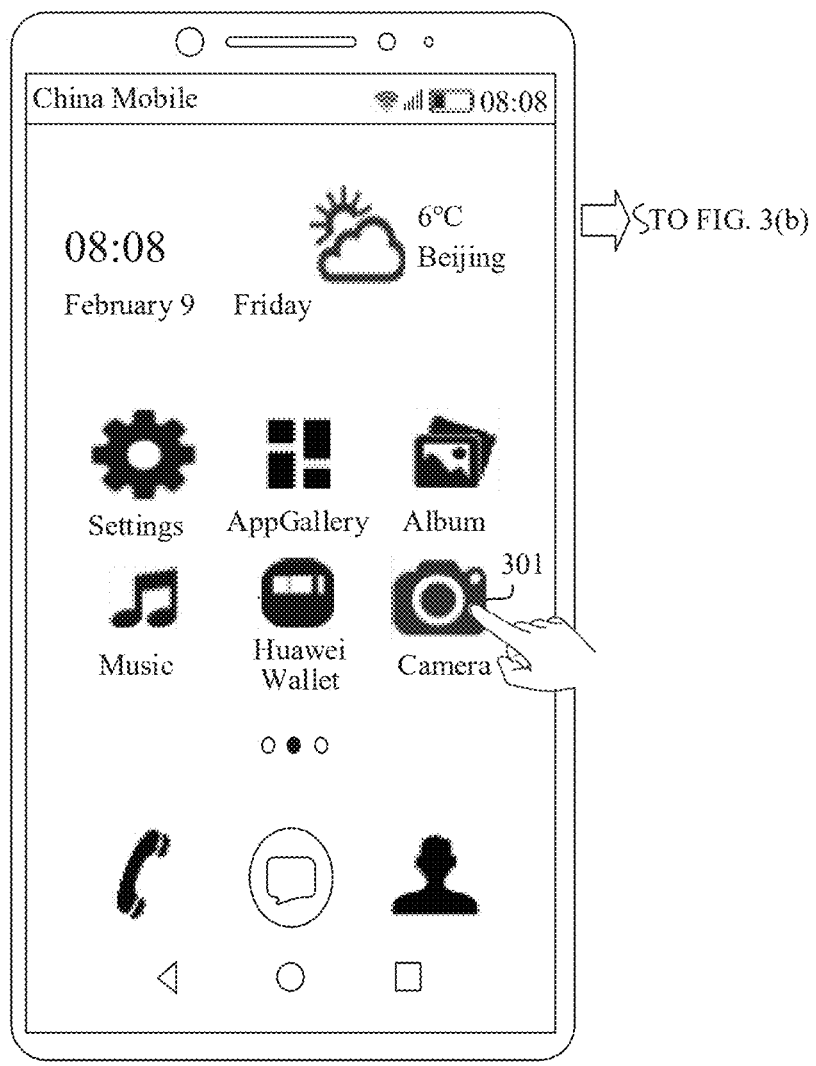
FIG. 3(a) to FIG. 3(d) are a schematic diagram of a group of interfaces according to an embodiment of this application.
Figure 3B:
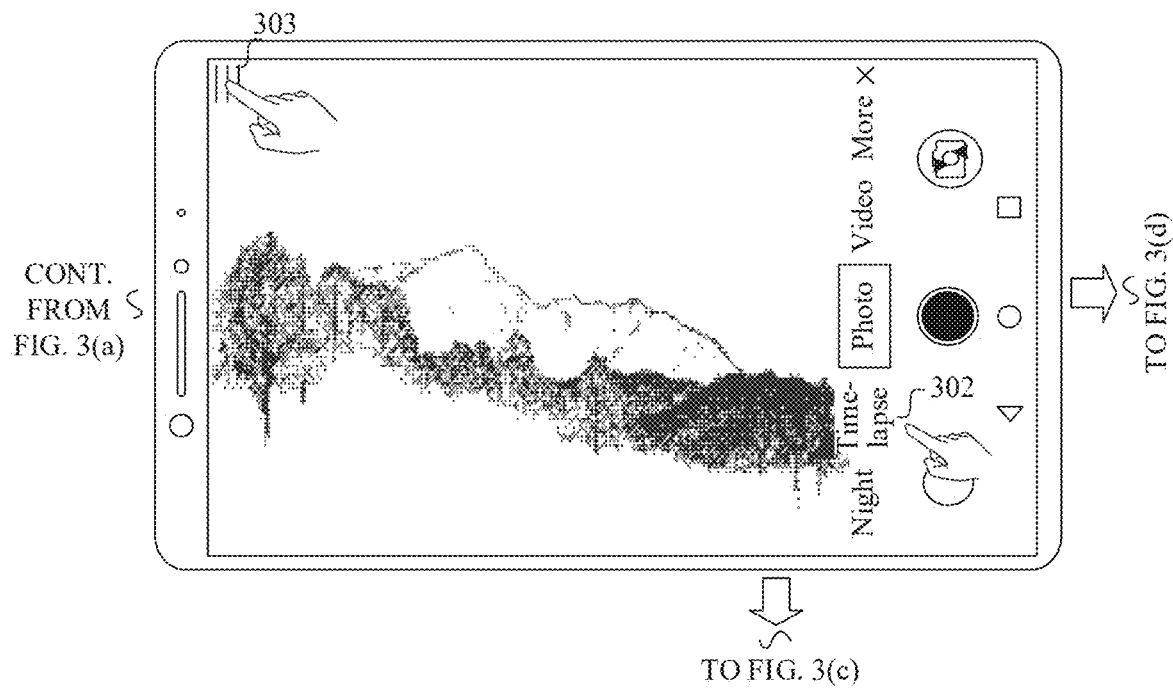

For example, after detecting an operation of tapping a camera icon 301 shown in FIG. 3(a) by a user, the mobile phone starts the camera application, and enters a shooting mode shown in FIG. 3(b). For example, after detecting an operation of tapping a time-lapse photography control 302 shown in FIG. 3(b) by the user, the mobile phone enters the time-lapse photography mode, and displays a preview interface shown in FIG. 3(c). In another example, after detecting an operation of tapping a control 303 shown in FIG. 3(b) by the user, the mobile phone displays an interface shown in FIG. 3(d). After detecting an operation of tapping a control 304 by the user, the mobile phone enters the time-lapse photography mode, and displays a preview interface shown in FIG. 3(c).

Figure 3C:
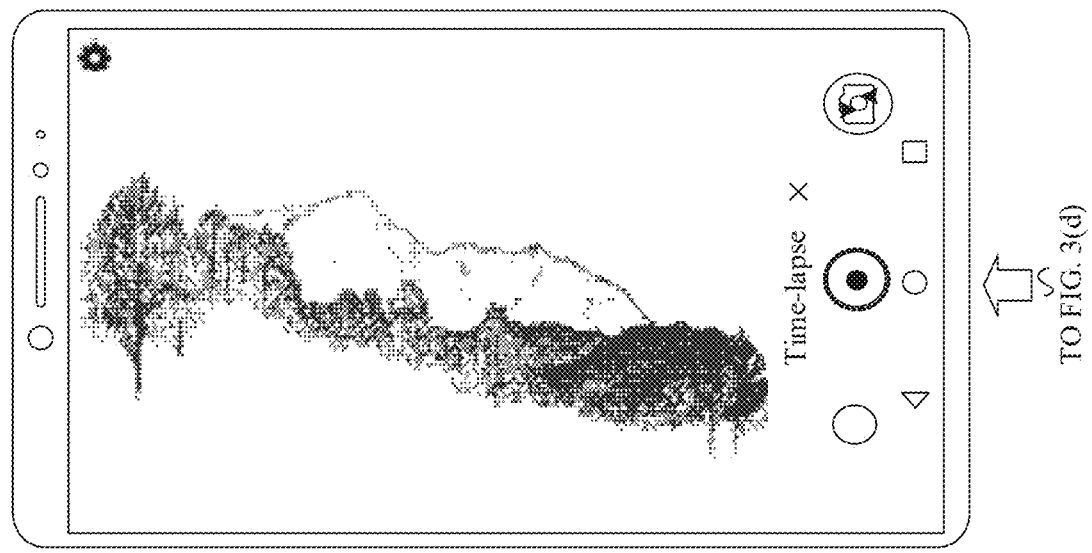
Figure 3D:
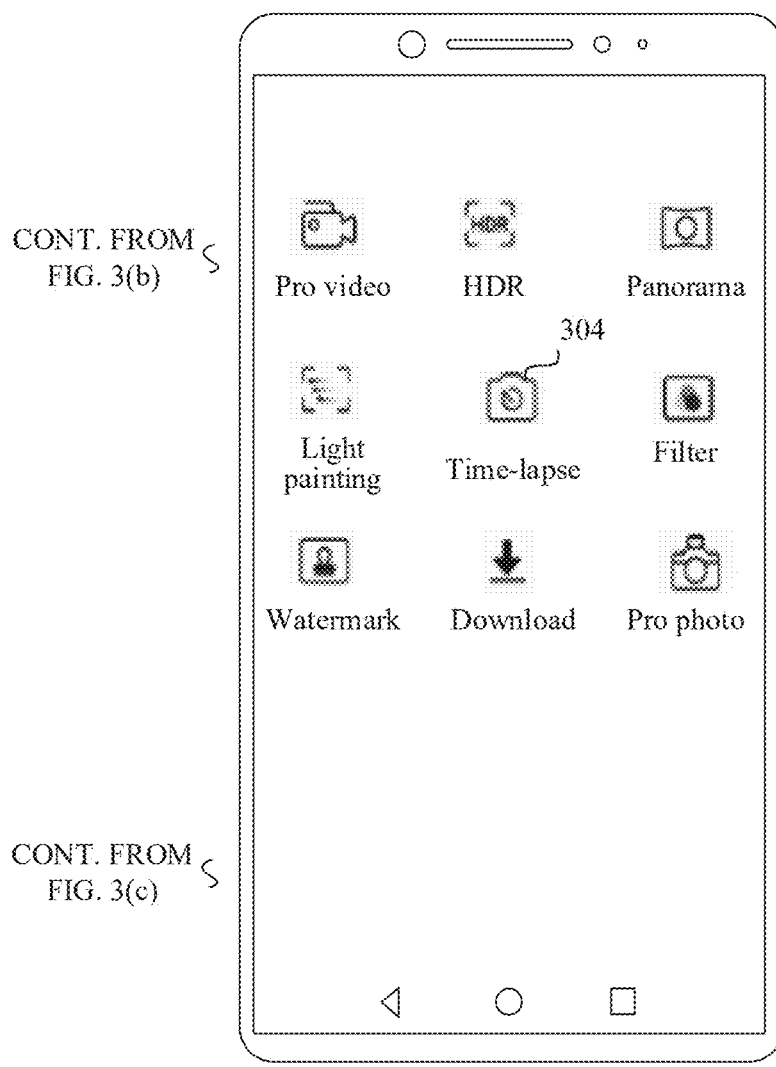

In another example, the mobile phone displays an interface of a desktop or a non-camera application, after detecting a voice instruction of entering the time-lapse photography mode of the user, enters the time-lapse photography mode, and displays a preview interface shown in FIG. 3(c).

It should be noted that the mobile phone may alternatively enter the time-lapse photography mode in response to an operation such as another touch operation, a voice instruction, or a shortcut gesture of the user. The operation of triggering the mobile phone to enter the time-lapse photography mode is not limited in embodiments of this application.

After the mobile phone enters the time-lapse photography mode, if a zoom in/out operation of the user is detected, a zoom ratio is reduced or increased, to display, on the preview interface, a preview image corresponding to an adjusted zoom ratio. If detecting a shooting operation of the user, the mobile phone performs shooting of time-lapse photography based on the adjusted zoom ratio. The mode may also be referred to as a normal submode of the time-lapse photography mode.

201: The mobile phone enters a movement submode of the time-lapse photography mode.

The time-lapse photography mode may further include a plurality of submodes such as a movement submode or a zoom in/out submode. In a preview state of the time-lapse photography mode, the mobile phone may enter the movement submode or the zoom in/out submode to perform shooting.

Figure 4:
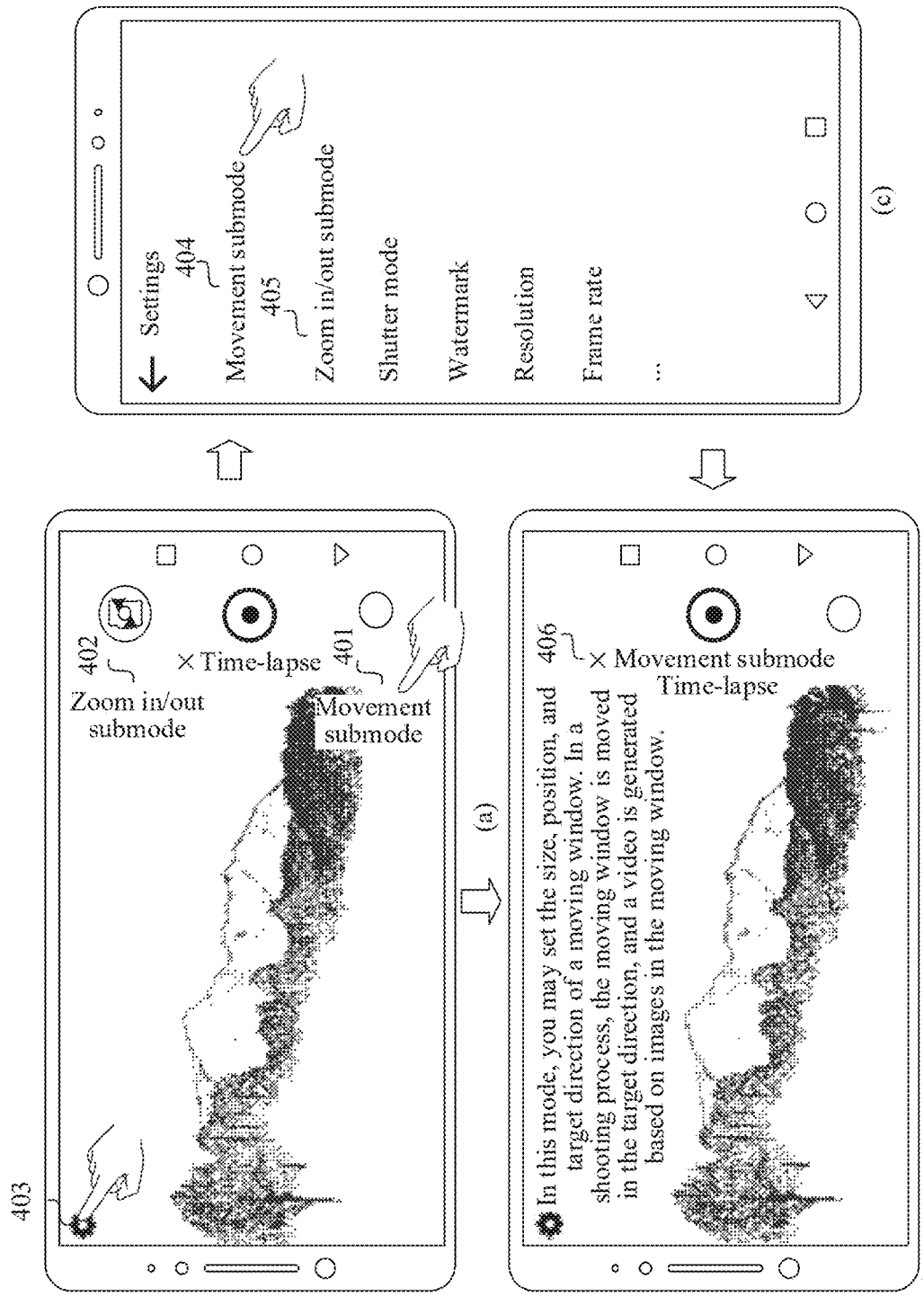
FIG. 4 is a schematic diagram of another group of interfaces according to an embodiment of this application.

For example, referring to (a) in FIG. 4, in the time-lapse photography mode, the preview interface includes a control 401 of the movement submode and a control 402 of the zoom in/out submode. After detecting an operation of tapping the control 401 by the user, the mobile phone enters the movement submode, and displays a preview interface shown in (b) in FIG. 4.

In another example, in the time-lapse photography mode, after detecting an operation of tapping a setting control 403 shown in (a) in FIG. 4 by the user, the mobile phone displays an interface shown in (c) in FIG. 4. The interface includes an option 404 of the movement submode and an option 405 of the zoom in/out submode. After detecting an operation of tapping the control 404 by the user, the mobile phone enters the movement submode, and displays a preview interface shown in (b) in FIG. 4.

It should be noted that the mobile phone may alternatively enter the movement submode in response to an operation such as another touch operation, a voice instruction, or a shortcut gesture of the user. An operation of triggering the mobile phone to enter the movement submode is not limited in embodiments of this application.

In a preview state of the movement submode, if detecting an operation of tapping an exit control 406 shown in (b) in FIG. 4 by the user, the mobile phone exits the movement submode. In a technical solution in which the mobile phone exits the movement submode, the mobile phone returns to the normal submode shown in (a) in FIG. 4. In another technical solution, the mobile phone returns to the shooting mode shown in FIG. 3(b).

The movement submode may be used to shoot a scene in which a to-be-shot field of view range moves, and provide the user with dynamic visual experience in which the field of view range constantly moves. For example, a to-be-shot region changes, and the to-be-shot field of view range also changes; or a to-be-shot subject changes, and therefore a position and a field of view range of the to-be-shot subject also change; or a to-be-shot subject remains unchanged but a position of the to-be-shot subject changes (for example, the to-be-shot subject is the sun at sunrise, and the position keeps changing when the sun rises from the sea), and the to-be-shot field of view range also changes.

In some embodiments, after entering the movement submode, the mobile phone may prompt the user with a function of the mode by displaying information, playing a voice announcement, or the like. For example, referring to (b) in FIG. 4, the mobile phone may prompt the user on the preview interface with "In this mode, you may set the size, position, and target direction of a moving window. In a shooting process, the moving window is moved in the target direction, and a video is generated based on images in the moving window."

202: The mobile phone determines association parameters of the moving window.

After entering the movement submode, the mobile phone may capture images by using a camera with a large field of view (for example, a wide-angle camera or an ultra-wide-angle camera), and generate an original image after processing by an ISP and the like. The mobile phone may display the generated original image on the preview interface.

The original image generated by the mobile phone has a preset size. For example, a resolution of the original image may be 1920*1080, 1280*720, 1152*768, 1024*768, or the like. The resolution of 1920*1080 is used as an example. The original image is a rectangle, a long side includes 1920 pixels, a wide side includes 1080 pixels, and an aspect ratio is 3:2. The associated parameters of the moving window include a start position, a size, and a target direction of the moving window. The moving window is a rectangle, and an aspect ratio (or referred to as a size ratio or a frame ratio) of the moving window is the same as an aspect ratio of the original image.

In a shooting process of the movement submode, the moving window starts from the start position of the original image and moves in the target direction, and when a side of the moving window touches a boundary of the original image, current shooting of time-lapse photography is ended. The mobile phone saves images in the moving window in the shooting process.

Figure 5:
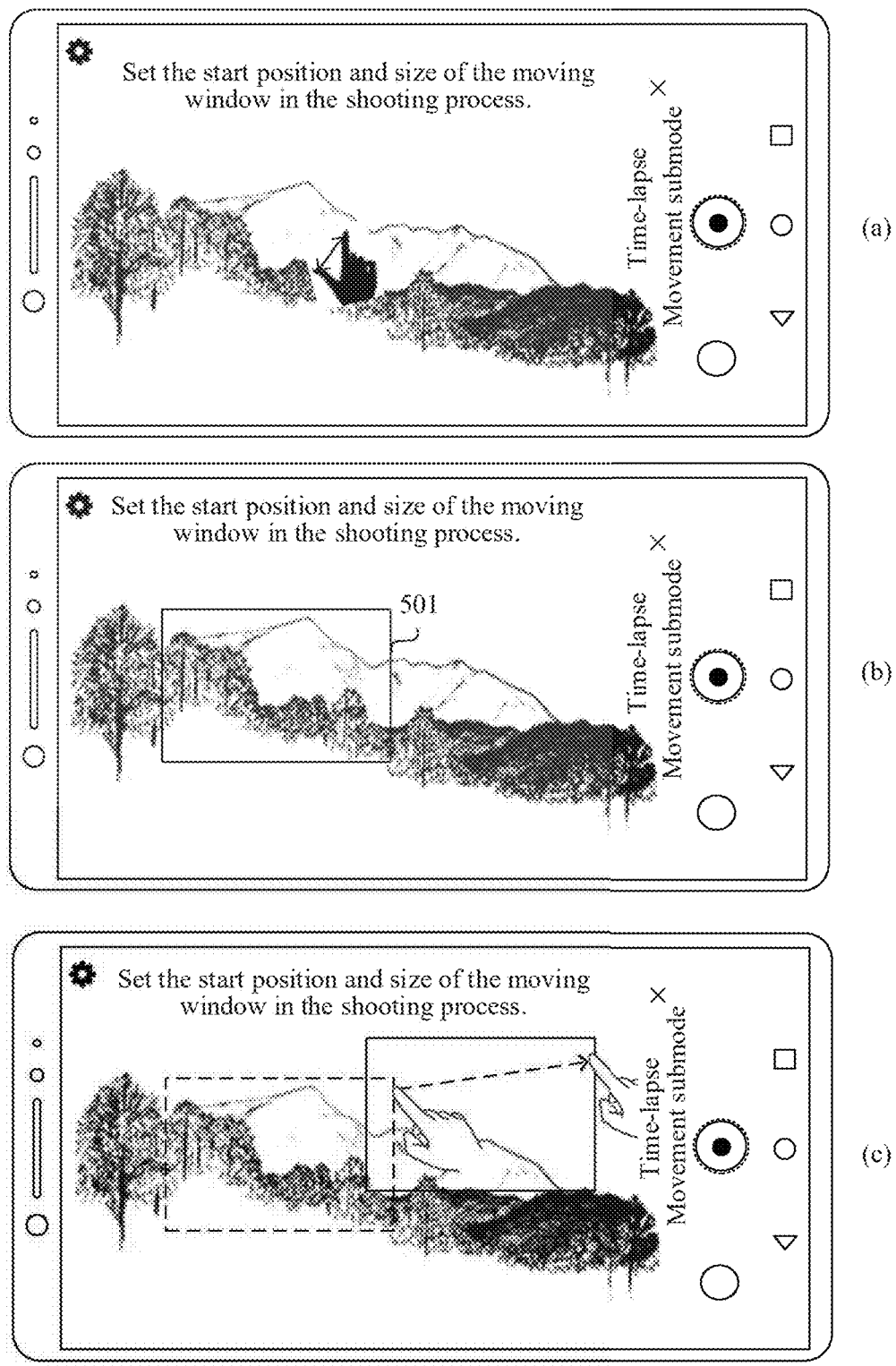
FIG. 5 is a schematic diagram of another group of interfaces according to an embodiment of this application.

In some embodiments, after entering the movement submode, the mobile phone may prompt, in a manner of displaying information, playing a voice announcement, or the like, the user to set the association parameters such as the start position, the size, and the target direction of the moving window. For example, referring to (a) in FIG. 5, the mobile phone prompts the user on the preview interface with "Set the start position and size of the moving window in the shooting process." The mobile phone may determine the start position, the size, and the target direction of the moving window based on a setting operation of the user.

For example, after detecting a preset operation of the user, the mobile phone displays the moving window on the preview interface. For example, in an implementation solution, referring to (a) in FIG. 5, after detecting a touch operation with two fingers on a screen by the user, as shown in (b) in FIG. 5, the mobile phone displays a moving window 501 at a touch position of the fingers on the preview interface. In addition, the mobile phone may adjust the position and/or size of the moving window based on a preset operation 2 of the user. For example, as the distance between the two fingers of the user increases, the moving window increases accordingly; and as the distance between the two fingers of the user decreases, the moving window decreases accordingly. Referring to (c) in FIG. 5, as the user drags the moving window, the position of the moving window changes accordingly. The touch operation with two fingers on the screen by the user may also be referred to as a zoom in/out operation with two fingers by the user. It should be noted that, in the movement submode, the zoom in/out operation with two fingers by the user changes the size of the moving window, but does not change the zoom ratio of the preview image. However, in the normal submode, the zoom in/out operation with two fingers by the user changes the zoom ratio of the preview image.

In another implementation solution, after detecting an operation of drawing a region on the preview interface with a finger by the user, the mobile phone displays a moving window at a position at which the user draws a track, where an area of the moving window matches that of the drawn range. The user may alternatively drag the moving window to change the position of the moving window. An operation manner of setting the size and position of the moving window by the user is not limited in embodiments of this application.

Figure 6:
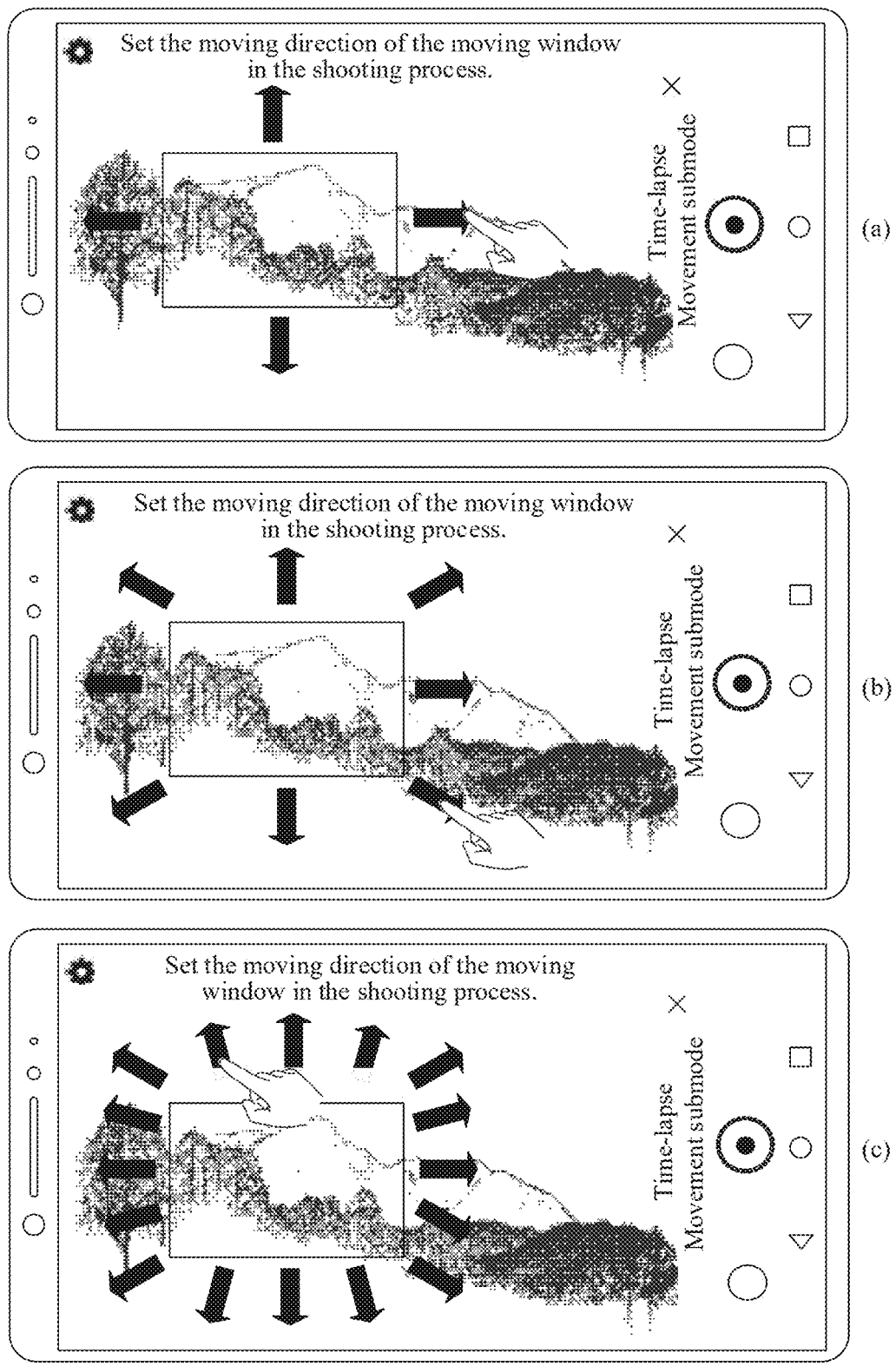
FIG. 6 is a schematic diagram of another group of interfaces according to an embodiment of this application.

After the moving window is displayed on the preview interface, the mobile phone may further prompt the user to set the target direction of the moving window in the shooting process. For example, referring to (a) to (c) in FIG. 6, the mobile phone displays, on the preview interface, direction controls respectively pointing to different directions. For example, the direction controls are arrows. The mobile phone may prompt the user with "Set the moving direction of the moving window in the shooting process."

Figure 7:
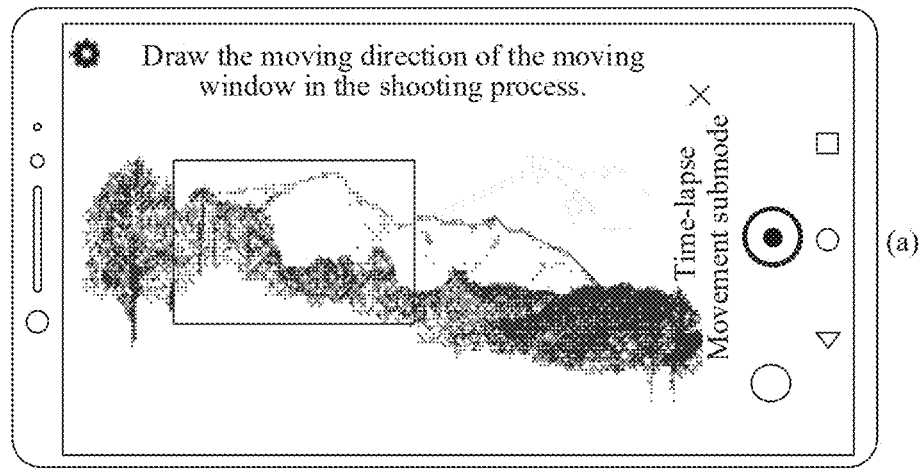
FIG. 7 is a schematic diagram of another group of interfaces according to an embodiment of this application.
Figure 7:
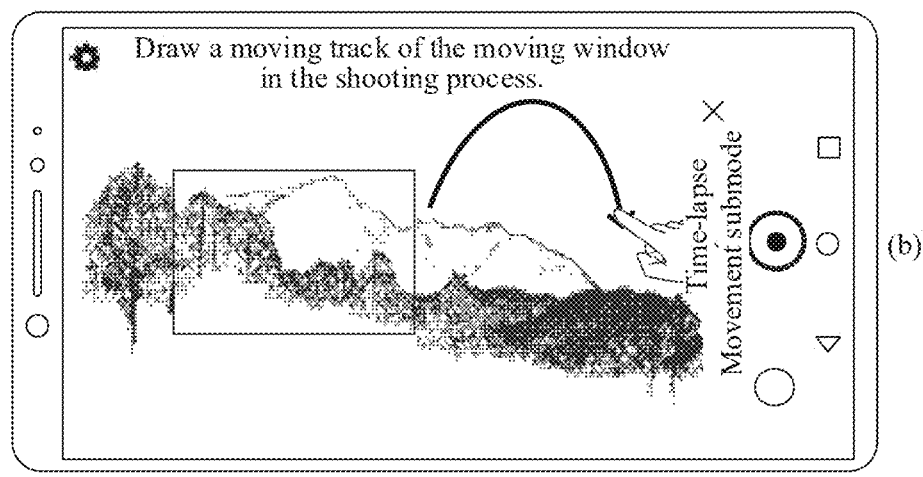

In another example, referring to (a) in FIG. 7, the mobile phone prompts the user on the preview interface with "Draw the moving direction of the moving window in the shooting process."

In another example, the mobile phone prompts, on the preview interface, the user to set an angle of the target direction of the moving window. For example, the angle may be 30° upward from the right, 18° upward from the left, or the like.

In another example, referring to (b) in FIG. 7, the mobile phone prompts the user on the preview interface with "Draw a moving track of the moving window in the shooting process."

In embodiments of this application, that the moving window moves in the target direction means that a position of the moving window on the original image changes in the target direction, and image content in the moving window changes with the position, but does not mean that image content in the moving window moves in the target direction.

Figure 8:
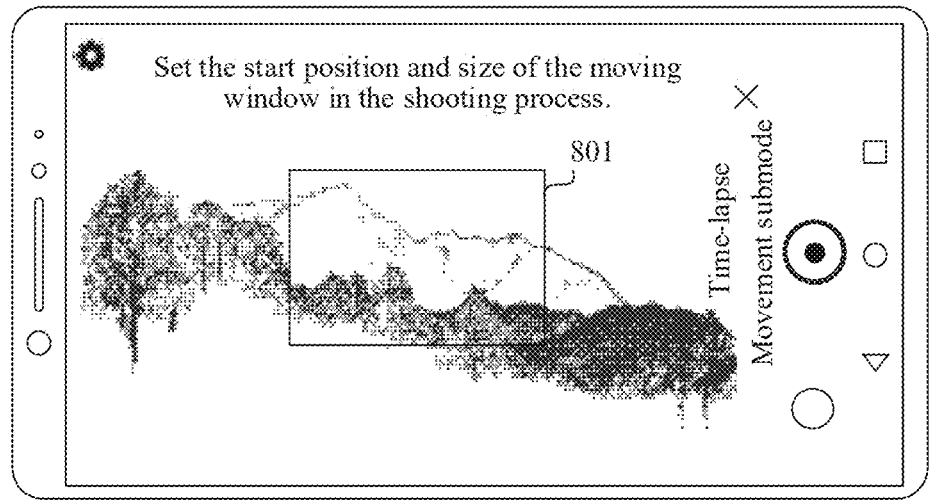
FIG. 8 is a schematic diagram of an interface according to an embodiment of this application.

In some other embodiments, referring to FIG. 8, after entering the movement submode, the mobile phone may automatically display a moving window 801, and does not need to display the moving window in response to an operation of the user. The moving window may be located at any position on the preview image, for example, located at a central position of the preview image. Similar to the foregoing embodiment, the mobile phone may adjust the size or position of the moving window in response to a setting operation of the user, and set the target direction of the moving window.

In some other embodiments, the association parameters of the moving window may further include a target speed. In the shooting process of the movement submode, the moving window may move in the target direction at the target speed.

After entering the movement submode, the mobile phone may further determine the target speed of the moving window. For example, in some technical solutions, the target speed is a preset fixed value; or the target speed is related to a current shooting scene, and different shooting scenes correspond to different target speeds. For example, in different scenes such as sunrise, flower opening, or cell division, the target speeds of the moving window are different. Alternatively, the target speed is related to a moving speed of a moving object in a current shooting scene. When the moving speed of the object is faster, a target moving speed is faster, and when the moving speed of the object is slower, the target moving speed is slower. For example, the to-be-shot subject is the sun in a sunrise scene, and the target speed may match a moving speed of the sun, so that the sun may be included in the moving window, and an image of the sun is saved in a time-lapse photography video as a target image.

In some other technical solutions, a moving speed adjustment control is displayed on the preview interface, and is configured to set the target speed of the moving window in the shooting process. For example, the moving speed adjustment control may be a control 901 shown in (a) in FIG. 9. The user may perform left/right dragging on the control 901. When the position of dragging by the user is closer to the right, the target speed of the moving window is faster. When the position of dragging by the user is closer to the left, the target speed of the moving window is slower.

It may be understood that, when the resolution of the original image is fixed, a quantity of pixels on the original image is fixed; and when the size of the moving window is fixed, a quantity of pixels in the moving window is also fixed, and the target speed of the moving window may be represented by a quantity of pixels that the moving window moves in a unit time. For example, the target speed may be 5 pixels/s.

In some embodiments of this application, in a shooting process, the mobile phone generates one frame of original image only after a specific time interval, and every time the mobile phone obtains one frame of original image, the mobile phone may change a coordinate position of the moving window once. In other words, coordinate positions of the moving window on adjacent original images are different, that is, the coordinate positions of the moving window on the adjacent original images are changed. Therefore, the target speed of the moving window may also be a quantity of pixels that the coordinate position of the moving window moves on two adjacent frames of original images. In other words, the target speed may be a quantity of pixels that the moving window moves on each frame of original image, or the target speed may be briefly referred to as a quantity of pixels that the moving window moves on each frame of original image.

For example, a target speed V represented in a unit time is 5 pixels/s. In other words, the moving window moves 5 pixels per second. A capture interval of the original image is 1 s, and an exposure duration of the original image is 30 ms. In other words, it may be understood that an interval at which the mobile phone obtains the original image is 1 s+30 ms=1.03 s. In this case, the target speed v is equal to V*1.03 s, that is, 5 pixels/s*1.03 s=5.15 pixels/frame, that is, a quantity of pixels that the moving window moves on each frame of original image is 5.15. The coordinate position of the moving window changes with a pixel as a minimum unit.

Therefore, a quantity of pixels in the target speed v should be an integer, and 5.15 pixels/frame are rounded (for example, rounded off) to 5 pixels/frame. In other words, the coordinate position of the moving window changes by five pixels on each frame of original image, or the coordinate position of the moving window changes by five pixels on two adjacent frames of original images. In embodiments of this application, there may be a plurality of rounding manners, for example, rounding off, rounding down, or rounding up. This is not limited.

It should be noted that when the target direction is up, down, left, or right, v has only one component; and when the target direction is another direction, for example, an upper left direction, a lower right direction, or 30° upward from the right, v includes a component of a horizontal axis (that is, a quantity of pixels that each frame moves on the horizontal axis) and a component of a vertical axis (that is, a quantity of pixels that each frame moves on the vertical axis).

In some embodiments, after the mobile phone detects an operation of adjusting the moving window by the user and determines the association parameters of the moving window, if a shooting operation of the user is subsequently detected, the mobile phone performs shooting of time-lapse photography based on the association parameters.

Figure 9:
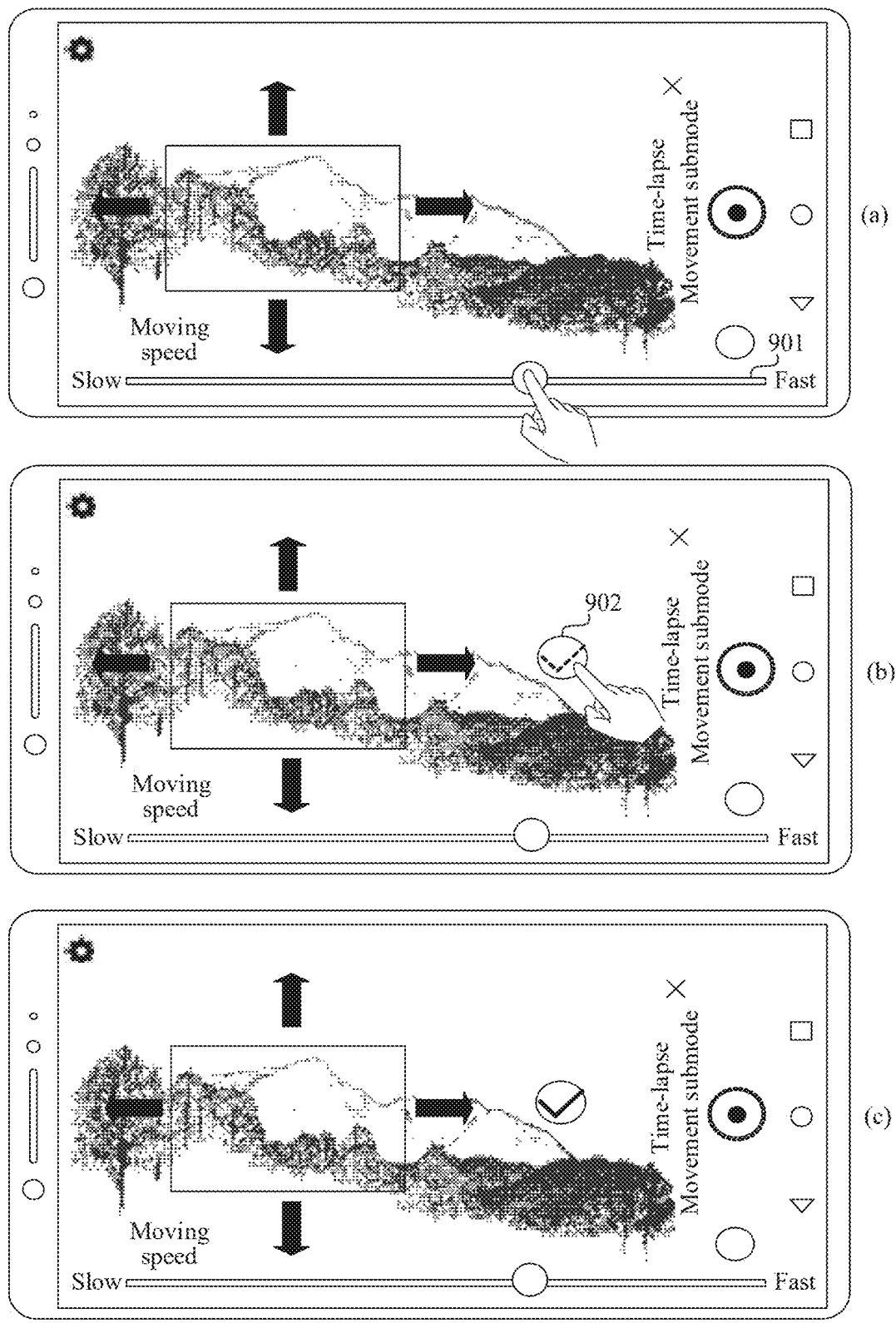
FIG. 9 is a schematic diagram of another group of interfaces according to an embodiment of this application.

In some other embodiments, referring to (b) in FIG. 9, the preview interface includes a confirmation control 902. After the mobile phone detects the operation of adjusting the moving window by the user and the confirmation control 902 is tapped, the confirmation control 902 changes to a form shown in (c) in FIG. 9, and the mobile phone determines the association parameters of the moving window. After determining the association parameters of the moving window, in some implementations, the mobile phone may display an interface obtained after the association parameters of the moving window are set, for example, an interface shown in (c) in FIG. 9. In some other implementations, the mobile phone may display only the original image and the moving window. After subsequently detecting the shooting operation of the user, the mobile phone performs shooting of time-lapse photography based on the association parameters.

203: After detecting the shooting operation of the user, the mobile phone displays recorded images on a shooting interface, and performs shooting of time-lapse photography based on the association parameters of the moving window.

Figure 10A:
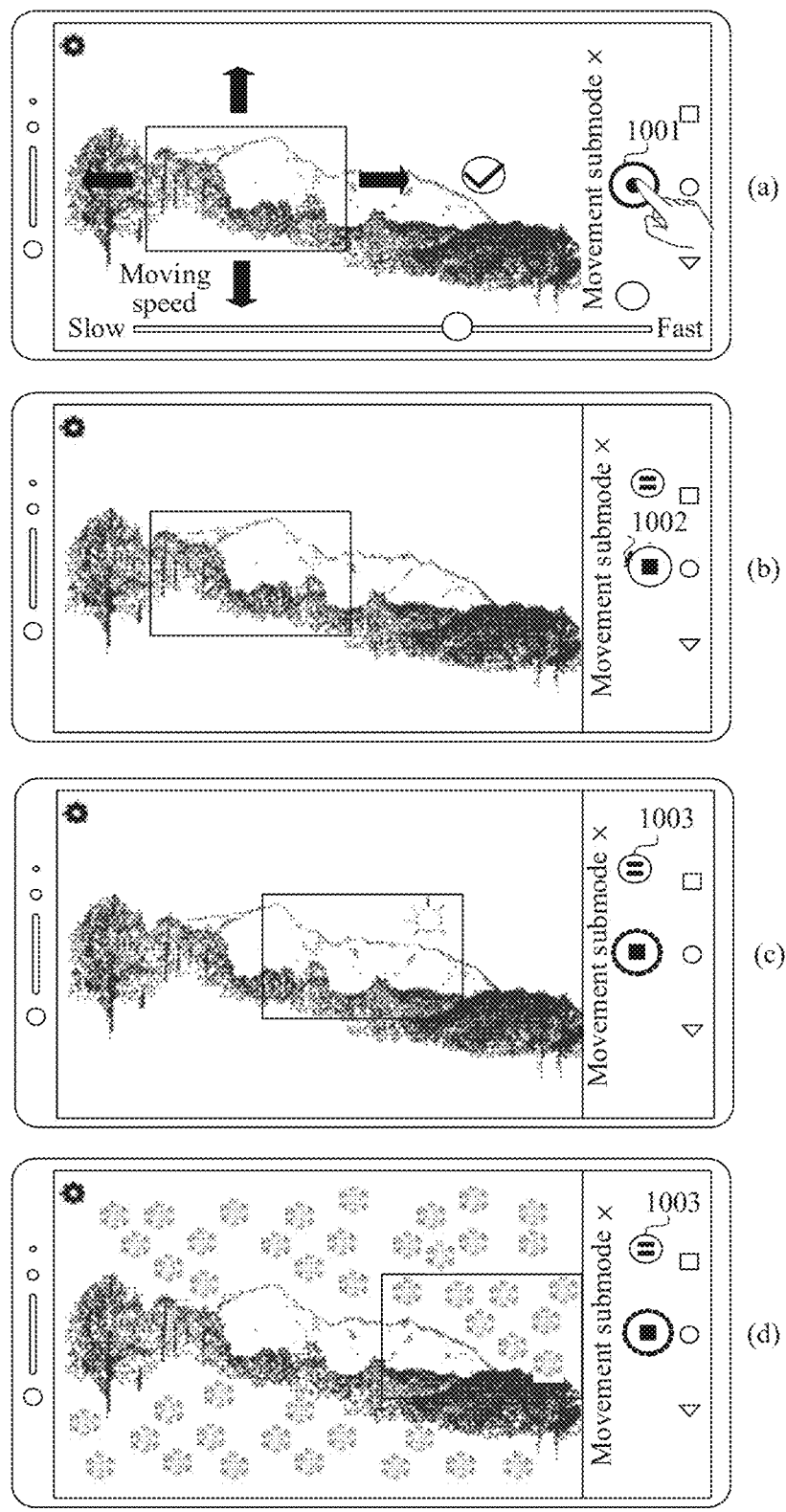
FIG. 10A is a schematic diagram of another group of interfaces according to an embodiment of this application.
Figure 10A:
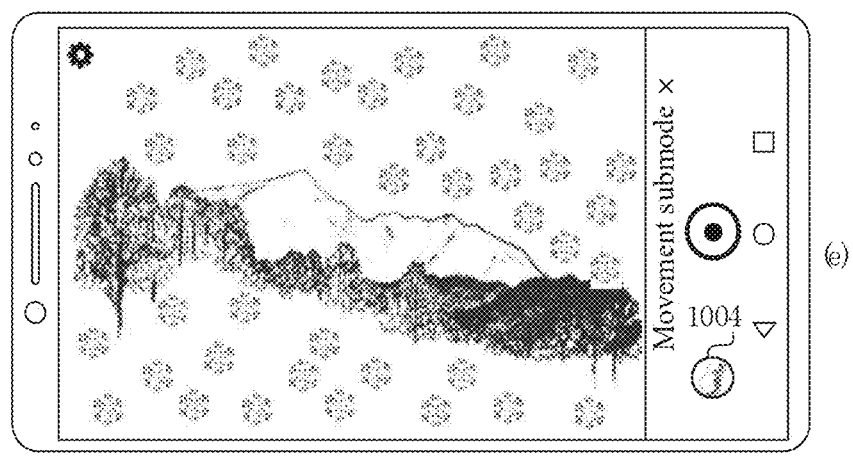

For example, after detecting an operation of tapping a shooting control 1001 shown in (a) in FIG. 10A by the user, the mobile phone starts to perform shooting of time-lapse photography, and displays a shooting interface. It may be understood that the mobile phone may alternatively perform shooting of time-lapse photography in response to an operation such as another touch operation, a voice instruction, or a shortcut gesture of the user. A specific form of the shooting operation is not limited in embodiments of this application.

In some embodiments, consistent with that in the preview state, the mobile phone displays, on the shooting interface, original images generated by the mobile phone and a moving window, and the original images are the recorded images. For example, for the shooting interface displayed after the mobile phone detects the shooting operation, refer to (b) in FIG. 10A. Different from that in the preview state, as a shooting process proceeds, the moving window on the shooting interface moves in a target direction at a target speed, and shooting ends after the moving window touches a boundary of an original image.

In the shooting process, the mobile phone continuously captures images based on parameters such as a capture interval (for example, 1 s, 3 s, 1 min, or 30 min) and an exposure duration of time-lapse photography, to continuously generate original images. In some embodiments, as shown in (b) in FIG. 10A, the shooting interface may include a control 1002, and the control 1002 starts to rotate after a shooting operation is detected. In a possible implementation, a duration in which the control 1002 rotates one full circle corresponds to an obtaining duration of the original image. The obtaining duration is a sum of the capture interval and the exposure duration. When the control rotates one full circle, the mobile phone generates a new frame of original image. In another possible implementation, a duration in which the control 1002 rotates one full circle corresponds to a preset duration 1 (for example, 5 s). When the control rotates one full circle, it indicates that a recording duration of the mobile phone has reached the preset duration 1 (for example, 5 s).

The capture interval between two adjacent frames of image may be automatically determined based on a current shooting scene. For example, in different scenes such as sunrise, sunset, flower opening, flower falling, or cloud rolling, capture intervals of two adjacent frames of image are also different. For example, in a sunrise scene, the mobile phone may set an image capture interval of the camera to 3 s based on a factor such as a light change or a dynamic change of the sun. In another example, in a flower opening scene, the mobile phone may set an image capture interval of the camera to 1 min. Alternatively, the capture interval between two adjacent frames of image may be a default interval duration of the mobile phone or an interval duration set by the user. The exposure duration is determined by an automatic exposure (automatic exposure, AE) module of the mobile phone based on factors such as ambient luminance in a current shooting environment.

Figure 10B:
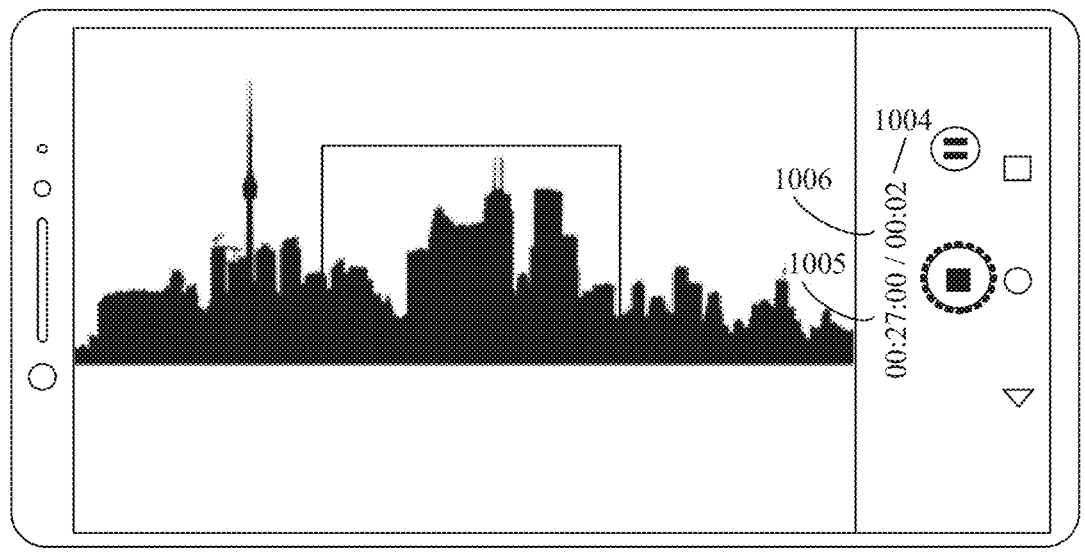
FIG. 10B is a schematic diagram of another interface according to an embodiment of this application.

In some embodiments, a time control is further displayed on the shooting interface, and the time control shows a recording duration and a playable duration that correspond to a shooting process. A recording duration T0 indicates a duration of current recording during current time-lapse photography, and a playable duration T1 indicates a duration in which a currently recorded time-lapse photography video can be played. Playable duration=recording duration/(capture interval+exposure duration)/play frame rate. The play frame rate may be a preset frame rate, for example, 25 frame/s or 30 frame/s, and the exposure duration is determined by the AE. For example, if the Milky Way is shot in a dark light scene at night, the exposure time is long, for example, 30 s, the capture interval is 3 s, and the play frame rate is 25 frame/s, the playable duration is calculated as follows: playable duration=recording duration/(3 s+30 s)/25 (frame/s). For example, referring to FIG. 10B, a recording duration 1005 in the time control 1004 is 00:27:30 (that is, 1650 s), and a playable duration 1006 is 00:02 (that is, 2 s).

The mobile phone changes the position of the moving window on the continuously generated original images in the target direction at the target speed. For example, the mobile phone may change coordinate positions of four vertices of the moving window on the original image in the target direction at the target speed. Correspondingly, the position of the entire moving window changes as the coordinates of the vertices change. In some embodiments, every time the mobile phone generates one frame of original image, the position of the moving window changes once in the target direction at the target speed. In a moving process of the moving window, a field of view range in the moving window also changes accordingly. For example, when the target direction is horizontally rightward, for a schematic diagram of a shooting interface of the mobile phone in a shooting process, refer to (c) in FIG. 10A. This case is mainly used as an example for description in the following embodiments.

In some other embodiments, the moving window moves once at an interval of a preset duration 2. In this case, for a same frame of original image, the position of the moving window may change several times on the frame of original image. For example, if the preset duration 2 is 1 s, the position of the moving window changes once at an interval of 1 s, and the mobile phone obtains one frame of original image at an interval of 3 s, the position of the moving window may change three times on the same frame of original image. Alternatively, the position of the moving window changes once every time N (an integer greater than 1) frames of original image are generated. For example, the preset duration 2 is 1 s, the position of the moving window changes once every 1 s, and the mobile phone obtains one frame of original image every 500 ms. In this case, the position of the moving window changes once every time two frames of original image are generated.

Figure 11:
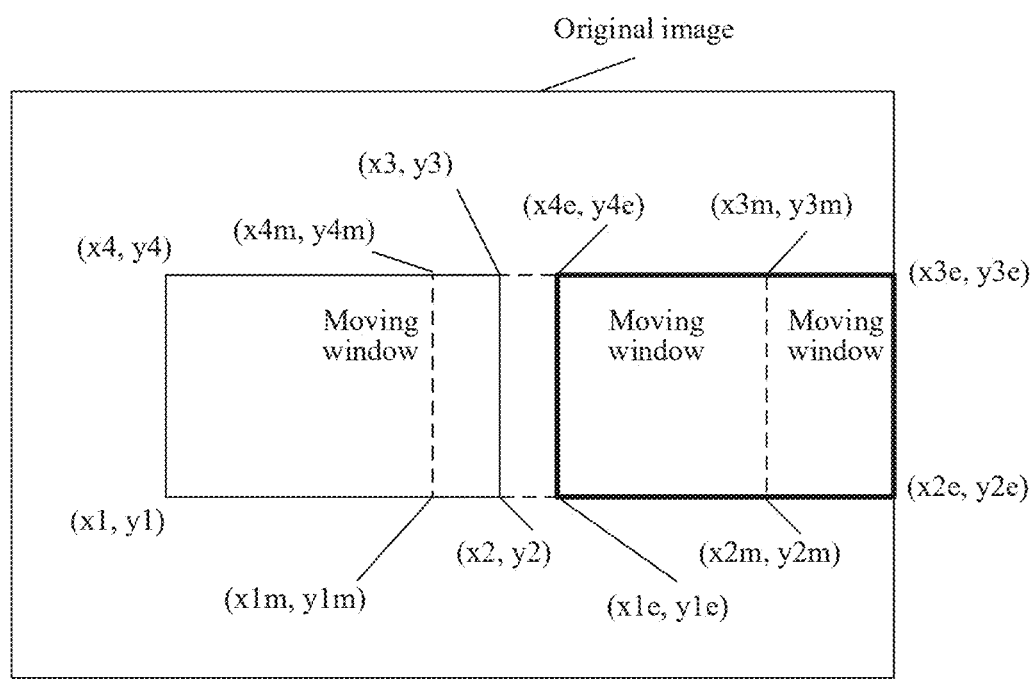
FIG. 11 is a schematic diagram of a coordinate change of a moving window according to an embodiment of this application.

In a technical solution, because the moving window cannot move beyond the boundary of the original image, the mobile phone may first determine, according to the target direction, that coordinates of four corresponding vertices before the moving window is about to move out of the boundary of the original image are (x1e, y1e), (x2e, y2e), (x3e, y3e), and (x4e, y4e). If coordinates of four vertices of the moving window at the start position on the first frame of original image generated in the shooting process are respectively (x1, y1). (x2, y2). (x3, y3), and (x4, y4), coordinates of four vertices of the moving window on an $m^{th}$ frame of original image are respectively (x1m, y1m), (x2m, y2m), (x3m, y3m), and (x4m, y4m) in the shooting process. On the $m^{th}$ frame of original image, a horizontal coordinate of a vertex of the moving window is x1m=x1+(x1e−x1)*v*(m−1), * indicates a multiplication sign, and v indicates a target speed, that is, a quantity of pixels that a vertex coordinate of the moving window moves on two adjacent frames of recorded image. Similarly, a vertical coordinate y1m=y1+(y1e−y1)*v*(m−1) of the vertex and coordinates of other vertices of the moving window on the $m^{th}$ frame of original image may also be calculated by using a similar method, and details are not described herein again. The mobile phone displays the $m^{th}$ frame of original image and the moving window on the shooting interface. The mobile phone crops the $m^{th}$ frame of original image to obtain a target image in the moving window, and saves the target image, to generate a time-lapse photography video based on the target image. For example, if the target direction is horizontally rightward, for a schematic diagram of movement of the moving window, refer to FIG. 11.

In another technical solution, coordinates of four vertices of the moving window on the $m^{th}$ (m is a positive integer) frame of original image generated by the mobile phone in a shooting process are respectively (x1m, y1m), (x2m, y2m), (x3m, y3m), and (x4m, y4m). The mobile phone displays the $m^{th}$ frame of original image and the moving window on the shooting interface. The mobile phone crops the $m^{th}$ frame of original image to obtain a target image in the moving window, and saves the target image, to generate a time-lapse photography video based on the target image. After generating an $(m+1)^{th}$ frame of original image, the mobile phone determines, according to the target direction and the target speed, that coordinates of the four vertices of the moving window are respectively (x1m+1, y1m+1), (x2m+1, y2m+1), (x3m+1, y3m+1), and (x4m+1, y4m+1). On the $(m+1)^{th}$ frame of original image, a horizontal coordinate of a vertex of the moving window is x1m+1=x1m+vx, and vx represents a component of the target speed on the horizontal axis, that is, a quantity of pixels that each frame moves on the horizontal axis. Similarly, a vertical coordinate of the vertex is y1m+1=y1m+vy, where vy represents a component of the target speed on the vertical axis, that is, a quantity of pixels that each frame moves on the vertical axis; coordinates of other vertices of the moving window may also be calculated by using a similar method, and details are not described herein again. The mobile phone displays the $(m+1)^{th}$ frame of original image and the moving window on the shooting interface. The mobile phone crops the $(m+1)^{th}$ frame of original image to obtain a target image in the moving window, and saves the target image, to generate a time-lapse photography video based on the target image.

In embodiments of this application, after cropping the $(m+1)^{th}$ frame of original image to obtain the target image in the moving window, the mobile phone enlarges the target image to a size of the original image and saves the target image. For example, the size of the original image is 1280*720, and sizes of the moving window and the target image obtained through cropping are 320*180. The mobile phone enlarges the size of the target image from 320*180 to 1280*720 by inserting pixels. In some other embodiments of this application, the mobile phone may alternatively save, in the shooting process, a target image whose size is the same as that of the moving window, and insert pixels during video playing or on another occasion, to enlarge the target image to a size the same as that of the original image.

In the solution described in the foregoing embodiment, the mobile phone displays the original images and the moving window on the shooting interface, so that the user can have intuitive visual experience that the moving window and the internal target image continuously move. In some other embodiments, when related parameters such as an initial position, a size, a target direction, and a target speed of the moving window have been set in a preview state, instead of displaying a complete original image in a shooting process, the mobile phone may enlarge and display a target image in the moving window on the shooting interface. The target image is a recorded image. Therefore, the target image with a constantly changing field of view range is purely displayed for the user, so that the shooting interface is simpler and more beautiful. A size of the target image that is enlarged and displayed is consistent with a size of the original image, that is, quantities of pixels included in the target image and the original image are the same. For a method for obtaining the target image displayed on the shooting interface in the shooting process, refer to the method for obtaining the target image in the moving window in the foregoing embodiment. Details are not described herein again.

In addition, in some other embodiments, after the mobile phone displays the moving window in the preview state, the preview interface may further include a confirmation control. After detecting an operation of tapping the confirmation control by the user, the mobile phone determines associated parameters of the moving window, and enlarges and displays an image in the moving window at a start position on the preview interface.

In embodiments of this application, the mobile phone may perform electronic image stabilization by cutting a frame around the target image, to ensure clarity and stability of the target image when the mobile phone shakes. In addition, in a shooting process, the mobile phone may detect a shake amplitude of the mobile phone. If the shake amplitude exceeds a preset threshold, the mobile phone may prompt the user that the picture shakes excessively and stops shooting.

In a shooting process, if the mobile phone detects a pause operation of the user (for example, an operation that the user taps a control 1003 shown in (c) in FIG. 10A), the mobile phone pauses shooting of time-lapse photography. During a shooting pause, in some embodiments, the camera stops capturing an image, and the image displayed on the shooting interface is not updated. In some other embodiments, the camera continues capturing an image but stops generating a target image. In some other embodiments, the camera continues capturing an image and generates a target image, but a moving window does not move, and the mobile phone does not store the target image generated in a pause process. After detecting the shooting operation of the user, the mobile phone continues to perform shooting of time-lapse photography.

204: After stopping shooting, the mobile phone generates a time-lapse photography video.

After detecting a shooting stop operation of the user, the mobile phone stops shooting of time-lapse photography, and generates a time-lapse photography video. Alternatively, referring to (d) in FIG. 10A, after determining that the moving window moves to a boundary of the original image, the mobile phone stops shooting of time-lapse photography, and generates a time-lapse photography video. For example, in a shooting process, if vertex coordinates of the moving window on an $n^{th}$ original image move beyond a boundary range of the $n^{th}$ a original image after the mobile phone generates the $n^{th}$ original image, shooting of time-lapse photography is stopped. For example, if the target direction is rightward, and a horizontal coordinate of a right vertex of the moving window on the $n^{th}$ original image changes from a horizontal coordinate less than a right vertex of the $n^{th}$ original image to a horizontal coordinate greater than the right vertex of the $n^{th}$ original image, the mobile phone determines that the moving window has moved to a boundary of the original image.

After the shooting is stopped, the video image in the time-lapse photography video generated by the mobile phone is the target image in the moving window. For example, referring to (e) in FIG. 10A, after stopping shooting, the mobile phone generates a thumbnail 1004. An image in the thumbnail 1004 is an image in a moving window when shooting starts, that is, a part of the original image. In a shooting process, the mobile phone retains a target image in a moving window on each frame of original image, and crops an image in the remaining area. In this way, when a video is played, an image displayed by the mobile phone on a play interface is a target image in a moving window in a shooting process after the image is enlarged.

Figure 12:
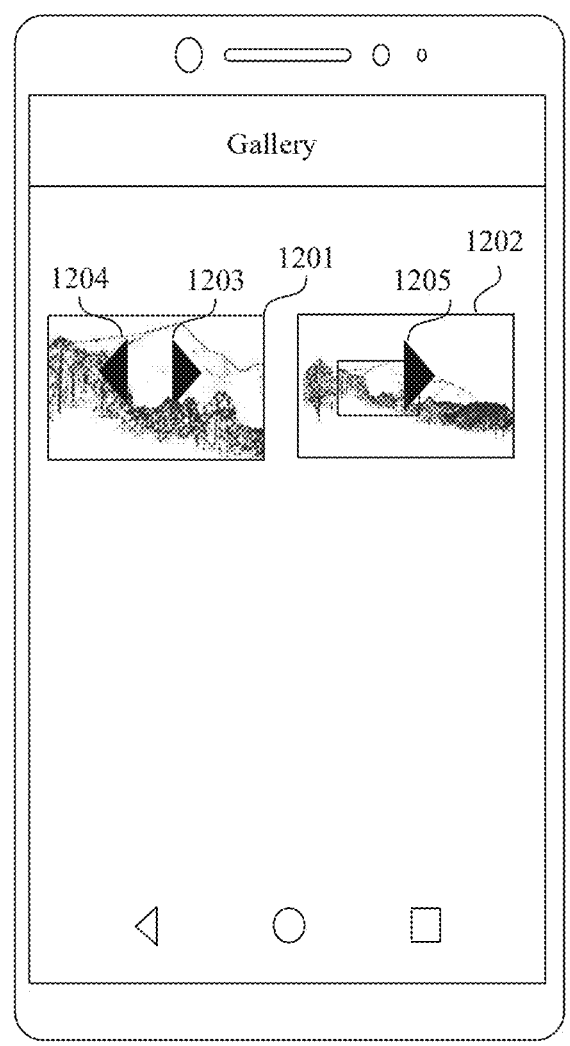
FIG. 12 is a schematic diagram of another interface according to an embodiment of this application.

After the shooting is stopped, as shown in FIG. 12, the mobile phone generates a time-lapse photography video 1201, where video images are saved target images in a moving window on the shooting interface. In some other embodiments, the mobile phone may further generate a time-lapse photography video 1202, where video images are saved images on the shooting interface.

In some embodiments of this application, in a shooting process, the mobile phone locally calculates a coordinate position of the moving window, and crops the target image from the obtained original image based on the coordinate position, to generate a time-lapse photography video. In some other embodiments, because a processing process of time-lapse photography needs to occupy large memory, a processing capability of the mobile phone may be improved by using a cloud. For example, in a shooting process, an original image obtained by the mobile phone may be uploaded to the cloud, a coordinate position of the moving window on the original image is calculated by using the cloud, a target image is cropped from the original image based on the coordinate position, and processing such as image definition enhancement is performed, to eventually generate a time-lapse photography video. The cloud may send the generated time-lapse photography video to the mobile phone for saving.

205: After detecting a play operation of the user, the mobile phone plays the time-lapse photography video.

After detecting the play operation of the user, the mobile phone may play the generated time-lapse photography video. As discussed above, playable duration=recording duration/(capture interval+exposure duration)/play frame rate. The recording duration/(capture interval+exposure duration) indicates a quantity of shot images, the play frame rate may be preset 25 frame/s, 30 frame/s, or the like, and the exposure duration may be determined by the AE based on a factor such as ambient luminance in a current shooting environment.

Figure 13:
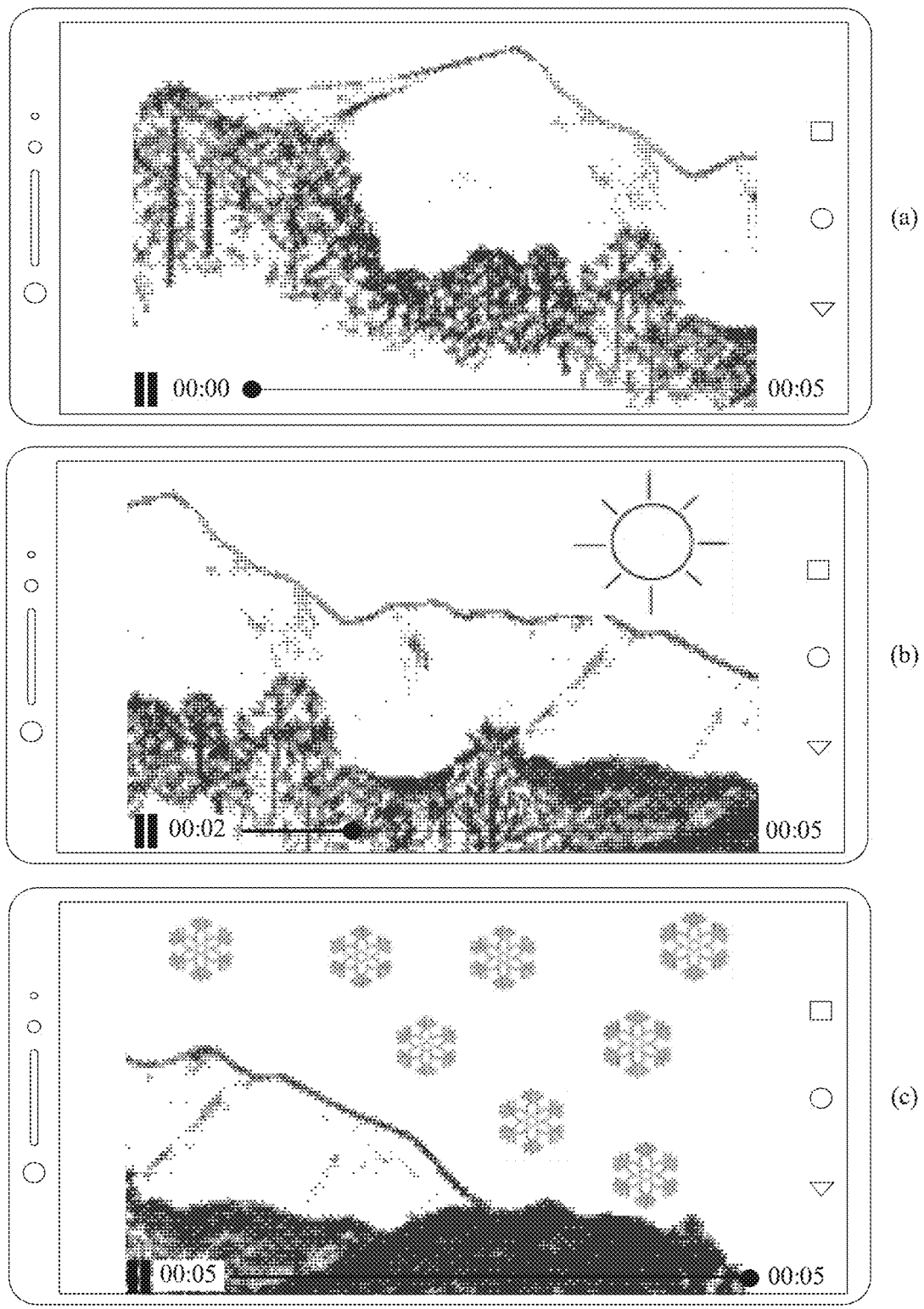
FIG. 13 is a schematic diagram of another group of interfaces according to an embodiment of this application.

For example, after detecting an operation of tapping a play control 1203 by the user, the mobile phone plays the time-lapse photography video 1201. Referring to schematic diagrams of play interfaces shown in (a) to (c) in FIG. 13, the mobile phone displays, on the play interfaces, target images in the moving window that keeps moving. In other words, the mobile phone may play, in a time-lapse manner by using the time-lapse photography video 1201, the shot target images whose field of view ranges constantly change. FIG. 13 shows a change process from a scenery view of a mountain on the left to a scenery view of a hill on the right.

Figure 14A:
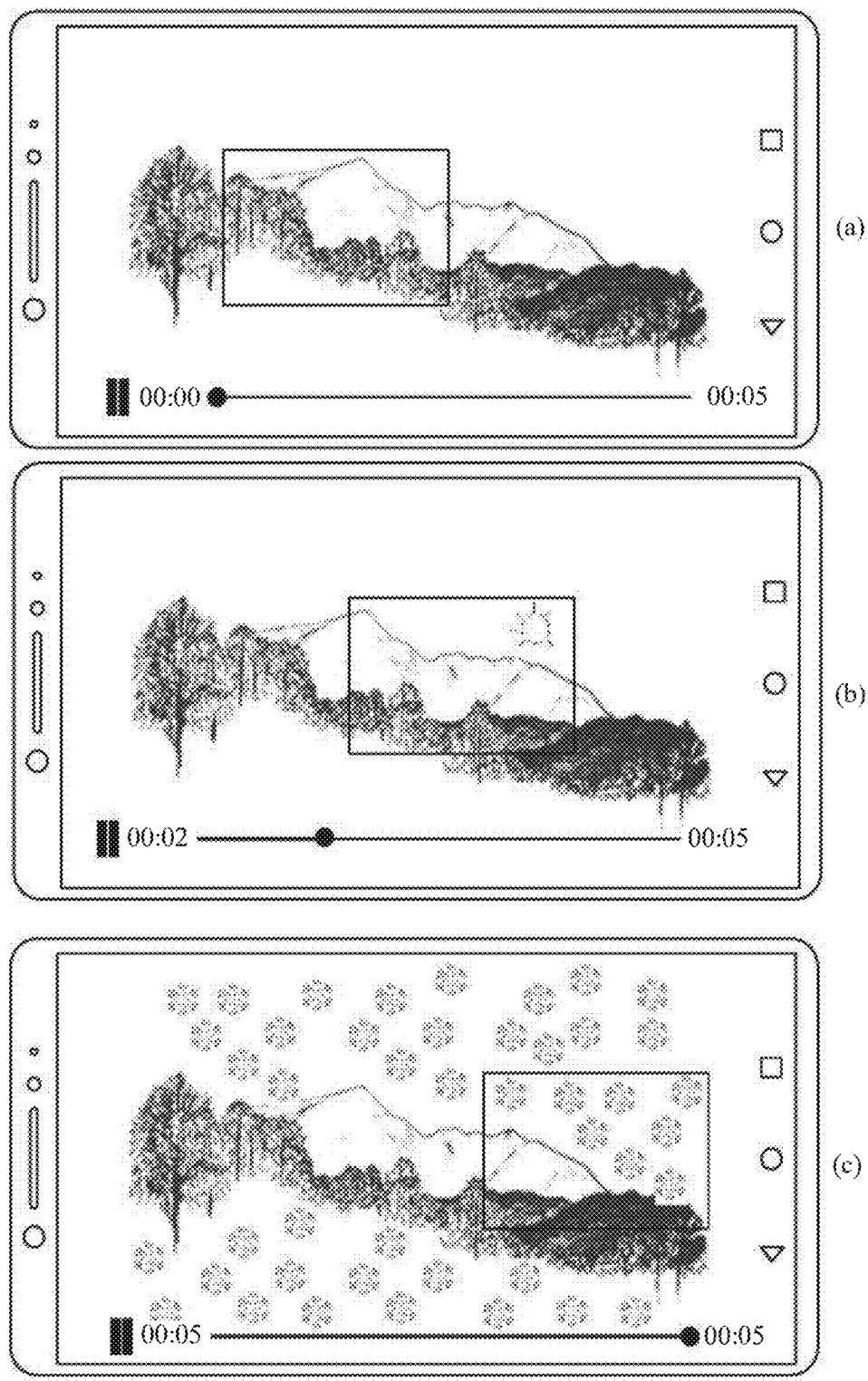
FIG. 14A is a schematic diagram of another group of interfaces according to an embodiment of this application.

In another example, after detecting an operation of tapping a play control 1205 by the user, the mobile phone plays the time-lapse photography video 1202. Referring to schematic diagrams of play interfaces shown in (a) to (c) in FIG. 14A, the mobile phone displays, on the play interfaces, original images in a shooting process and the moving window that keeps moving. In other words, the mobile phone may play, by using the time-lapse photography video 1202, the shooting interface in the shooting process in a time-lapse manner.

Figure 14B:
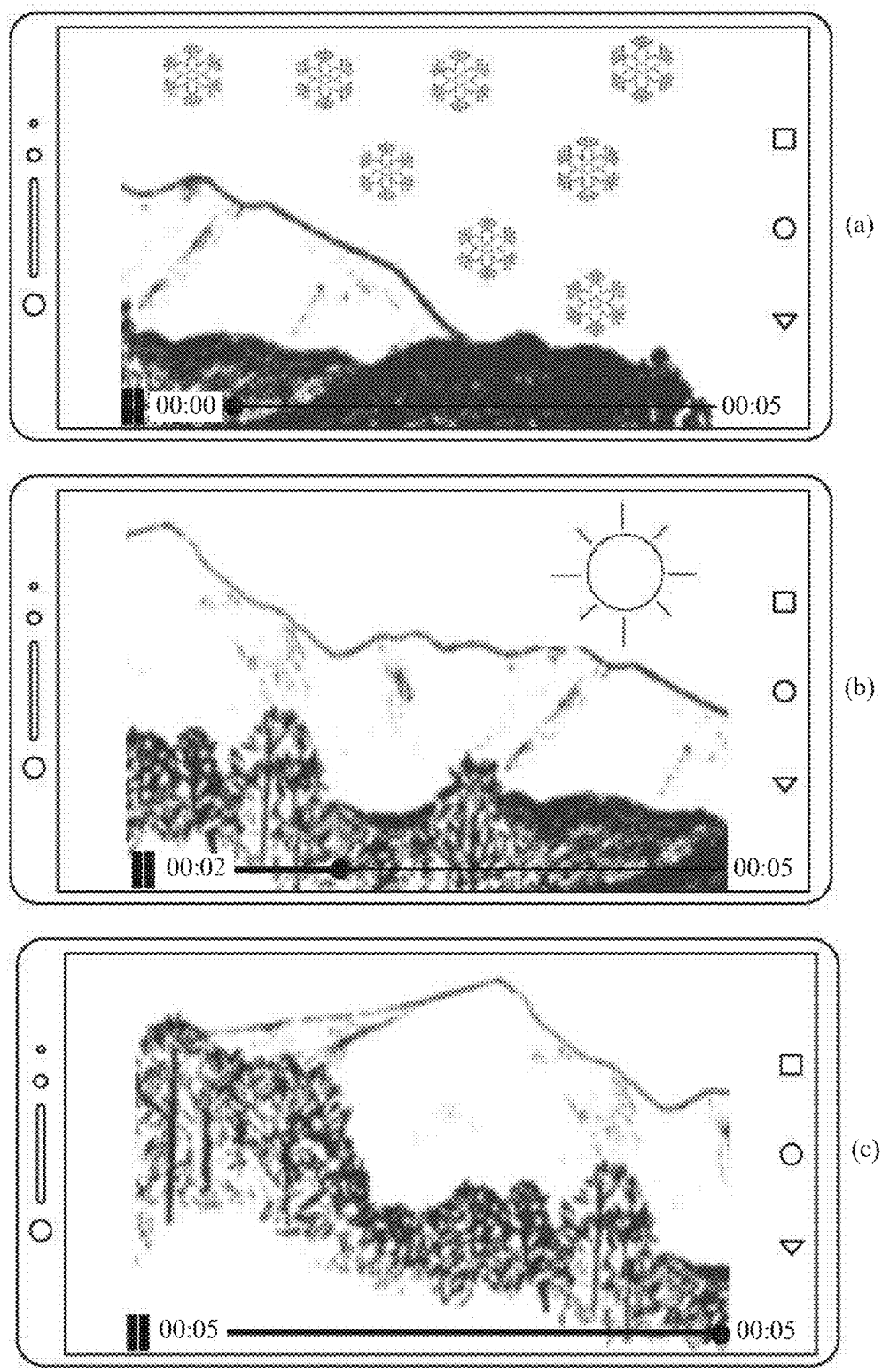
FIG. 14B is a schematic diagram of another group of interfaces according to an embodiment of this application.

In some other embodiments, the time-lapse photography video generated by the mobile phone may be played in reverse order, to present a reverse process of a shooting process to the user. For example, a shooting process records a process in which the field of view range of the target image changes from left to right, and reverse playing may present a process in which the field of view range of the target image changes from right to left to the user. In another example, a shooting process records a process in which the sun rises from the sea level, and reverse playing may present a process in which the sun falls from the sky into the sea level to the user. For example, after the mobile phone detects an operation of tapping a play control 1204 by the user, as shown in (a) to (c) in FIG. 14B, the mobile phone plays the time-lapse photography video 1201 in reverse order. FIG. 14B shows a change process from the scenery view of the hill on the right to the scenery view of the mountain on the left.

In some embodiments of this application, an aspect ratio of the moving window is the same as that of the original image, for example, both are 16:9 or 3:2, that is, an aspect ratio of the target image in the moving window is the same as an aspect ratio of the original image. In this way, when the recorded image displayed on the shooting interface is the target image in the moving window, a size of the recorded image viewed by the user on the shooting interface can be consistent with a size of the preview image on the preview interface, thereby providing the user with good visual experience. When the video image in the time-lapse photography video is the target image in the moving window, during video playing, an aspect ratio of the target image enlarged and displayed by the mobile phone on the play interface may be the same as that of the original image, so that a size of the video image viewed by the user on the play interface is the same as sizes of the images on the preview interface and the shooting interface, thereby providing the user with good visual experience.

In some other embodiments, the mobile phone includes a long-focus camera with a small field of view, and a shooting range of the long-focus camera may change with rotation of the camera. In embodiments of this application, the long-focus camera may rotate correspondingly based on the target direction and the target speed of the moving window, so that the long-focus camera can capture, in real time, an image in a field of view range corresponding to the moving window in a moving process. In this way, the target images in the moving windows on the preview interface and the shooting interface may be obtained based on the images captured by the long-focus camera. Because the field of view of the long-focus camera is small, pixel density of the captured image is greater than pixel density of the image captured by the camera with a large field of view. Therefore, when the target image in the moving window is obtained based on the image captured by the long-focus camera, a cropping range is small or cropping is not required, the target image in the moving window includes a large quantity of original pixels on the original image, and a small quantity of pixels are inserted when the mobile phone enlarges the target image to a size of the original image Therefore, the generated video image is clearer.

In the movement submode, in a shooting process of time-lapse photography, the mobile phone may automatically adjust a position of the moving window based on association parameters of the moving window, to automatically determine a field of view range of a target image, and automatically adjust a to-be-recorded shooting range of a video without using an external apparatus such as a guide rail to perform an operation such as panning on a lens and without manually adjusting the shooting range by the user in real time. This can help the user shoot a scene in which a to-be-shot range moves, to provide the user with dynamic video experience in which a field of view range constantly moves.

In the solution described in the foregoing embodiments, the size, target direction, and target speed of the moving window are fixed in a shooting process. In some other embodiments of this application, the association parameters such as the size, target direction, or target speed of the moving window are variable in a shooting process. In this way, the user can adjust the association parameters of the moving window at any time in a shooting process, to obtain a target image and a video image that dynamically change, thereby meeting a personalized shooting requirement of the user and improving shooting experience of the user. For example, in a shooting process, when the user wants to switch to record a different scenery scene in a current time-lapse photography video, the user may move the mobile phone to another scenery scene, and may further adjust the association parameters of the moving window, to perform recording by using association parameters of a moving window that match a new scenery scene. For example, the mobile phone may switch from shooting sunrise to shooting flowing cloud.

In some technical solutions, after detecting a preset operation of the user, the mobile phone displays a direction control on the shooting interface. For example, the preset operation may be a voice instruction operation, a touch operation, a mid-air gesture operation, or the like of the user. This is not limited. For example, the preset operation may be a double-tap operation performed by the user on the shooting interface. In a shooting process, if the mobile phone detects an operation of selecting the direction control by the user, and a direction indicated by the direction control is different from a previous target direction, the direction indicated by the direction control currently selected by the user is used as a new target direction. After detecting that the user completes an adjustment operation, the mobile phone stops displaying the direction control on the shooting interface. For example, the shooting interface further includes an adjustment confirmation control. After detecting an operation of tapping the adjustment confirmation control by the user, the mobile phone determines that the user completes the adjustment operation, and therefore stops displaying the direction control on the shooting interface. In a subsequent shooting process, the moving window moves in the new target direction.

After detecting another preset operation of the user, the mobile phone displays a moving speed adjustment control on the shooting interface. In a shooting process, if the mobile phone detects an operation of adjusting the target speed by the user by using the moving speed adjustment control, the moving window moves at the adjusted target speed. In addition, in a shooting process, if the mobile phone detects an operation of dragging the moving window by the user to change a size of the window, the moving window moves with a changed size.

In some other technical solutions, after detecting a preset operation of the user, the mobile phone displays a direction control and a moving speed adjustment control on the shooting interface. The user may adjust the target direction and the target speed of the moving window in the shooting process at any time by using the direction control and the moving speed adjustment control. The user may further drag the moving window to change the size of the window. After detecting that the user completes an adjustment operation, the mobile phone stops displaying the direction control and the moving speed adjustment control on the shooting interface.

In some other technical solutions, the mobile phone automatically and continuously displays the direction control and the moving speed adjustment control on the shooting interface. The user may adjust the target direction and the target speed of the moving window at any time by using the direction control and the moving speed adjustment control. The user may further drag the moving window to change the size of the window.

Figure 15A:
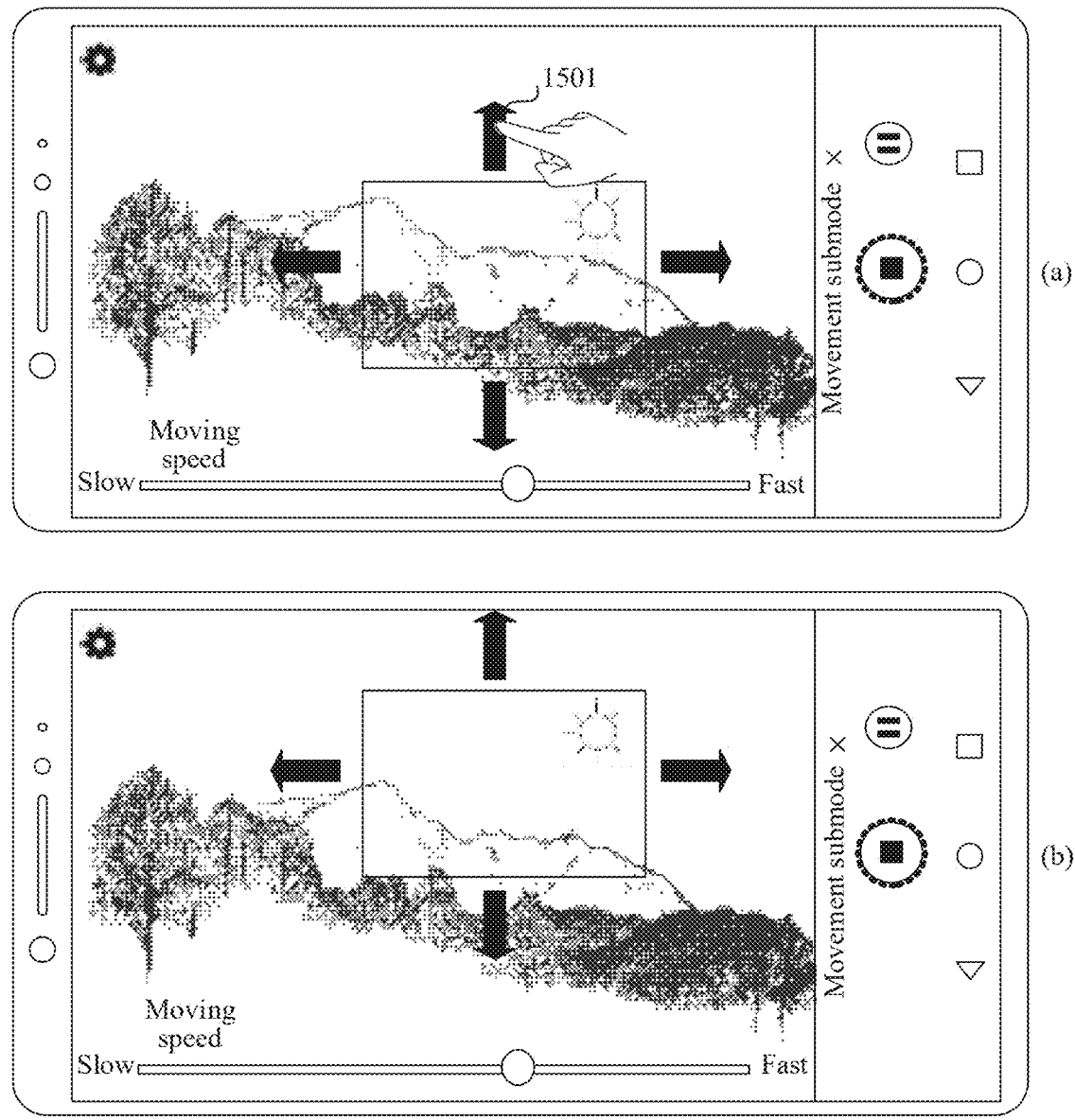
FIG. 15A is a schematic diagram of another interface according to an embodiment of this application.
Figure 15B:
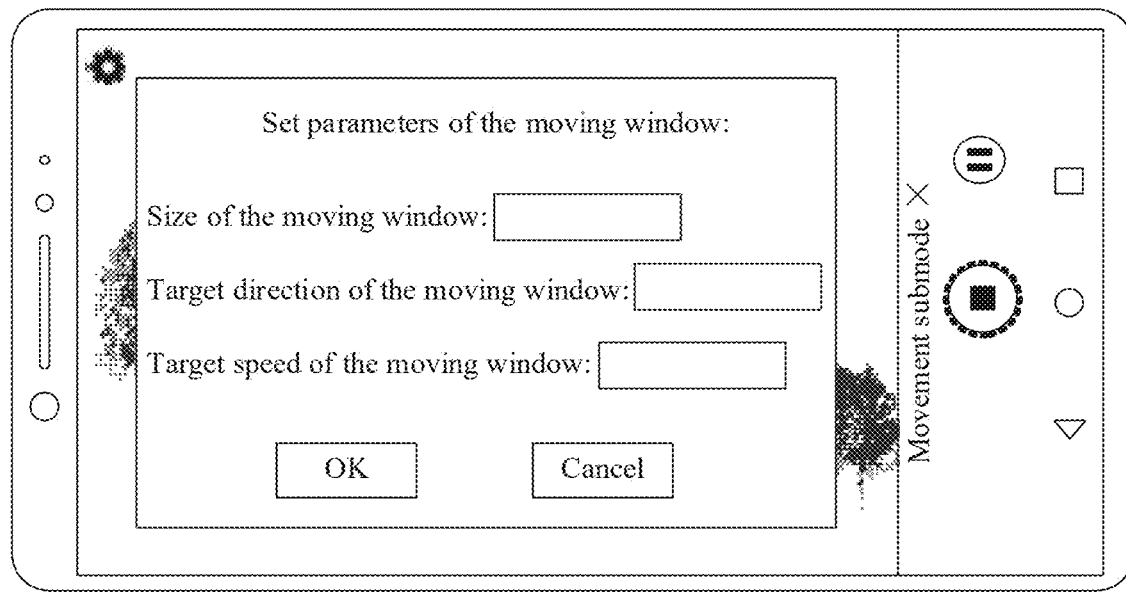
FIG. 15B is a schematic diagram of another interface according to an embodiment of this application.

For example, referring to (a) in FIG. 15A, the shooting interface includes the direction control (that is, an arrow shown in the figure) and the moving speed adjustment control. After the mobile phone detects an operation of tapping an arrow 1501 by the user, in a subsequent shooting process, as shown in (b) in FIG. 15, the moving window moves in a direction indicated by the arrow 1501.

In some other technical solutions, in a shooting process, after detecting a preset operation of the user, the mobile phone displays a window adjustment interface. The window adjustment interface may be used to adjust parameters such as the size, target direction, or target speed of the moving window. For example, for a schematic diagram of the window adjustment interface, refer to FIG. 15B.

In some other technical solutions, in a shooting process, after detecting a pause operation of the user, the mobile phone temporarily stops shooting of time-lapse photography, and automatically displays a window adjustment interface. The user may adjust parameters based on the window adjustment window or may close the window adjustment window.

In some other technical solutions, the association parameters of the moving window may further include an adjustment ratio. In a preview state, the user may set the adjustment ratio. In a shooting process, a user may set the adjustment ratio, and during movement based on the target direction and the target speed, the size of the moving window further continuously changes based on the adjustment ratio. For example, when the adjustment ratio is less than 1 (for example, 0.8 or 0.5), the size of the moving window continuously decreases on two adjacent frames of original image in a shooting process based on the adjustment ratio. In another example, when the adjustment ratio is greater than 1 (for example, 1.2 or 1.5), the size of the moving window continuously increases on two adjacent frames of original image in a shooting process based on the adjustment ratio in the shooting process.

It may be understood that the foregoing preset operations used to trigger different operations may be different.

Figure 16:
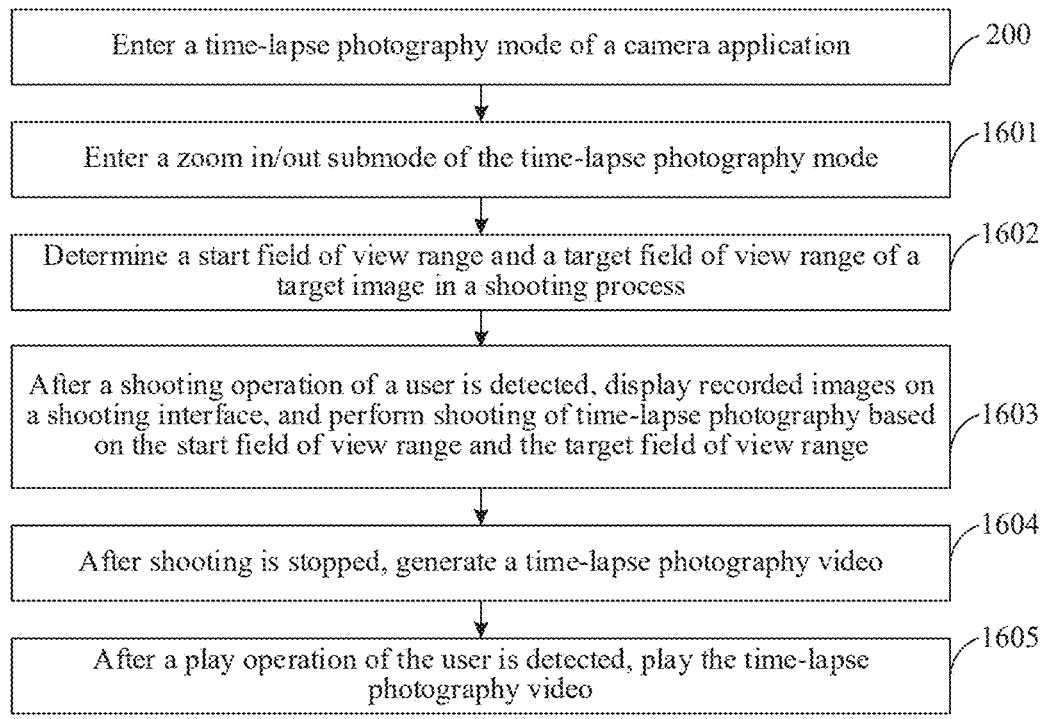
FIG. 16 is a flowchart of another shooting method according to an embodiment of this application.

The following describes time-lapse photography in the zoom in/out submode. Referring to FIG. 16, after step 200, the method may include the following steps.

1601: The mobile phone enters the zoom in/out submode of the time-lapse photography mode.

In the preview state of the time-lapse photography mode, the mobile phone may enter the zoom in/out submode. For example, after detecting an operation of tapping the control 402 shown in (a) in FIG. 4 by the user, the mobile phone enters the zoom in/out submode, and displays a preview interface shown in (a) in FIG. 17. In another example, after detecting an operation of tapping a control 405 shown in (c) in FIG. 4 by the user, the mobile phone enters the zoom in/out submode, and displays a preview interface shown in (a) in FIG. 17.

In some other embodiments, after starting the camera application, the mobile phone enters the shooting mode, and displays a control for normal time-lapse photography, a control for movement time-lapse photography, and a control for zoom in/out time-lapse photography on the preview interface. The mobile phone respectively enters the normal submode, the movement submode, or the zoom in/out submode of time-lapse photography in response to an operation performed by the user on these controls.

It may be understood that the mobile phone may alternatively enter the zoom in/out submode in response to an operation such as another touch operation, a voice instruction, or a shortcut gesture of the user. An operation of triggering the mobile phone to enter the zoom in/out submode is not limited in embodiments of this application.

Figure 17:
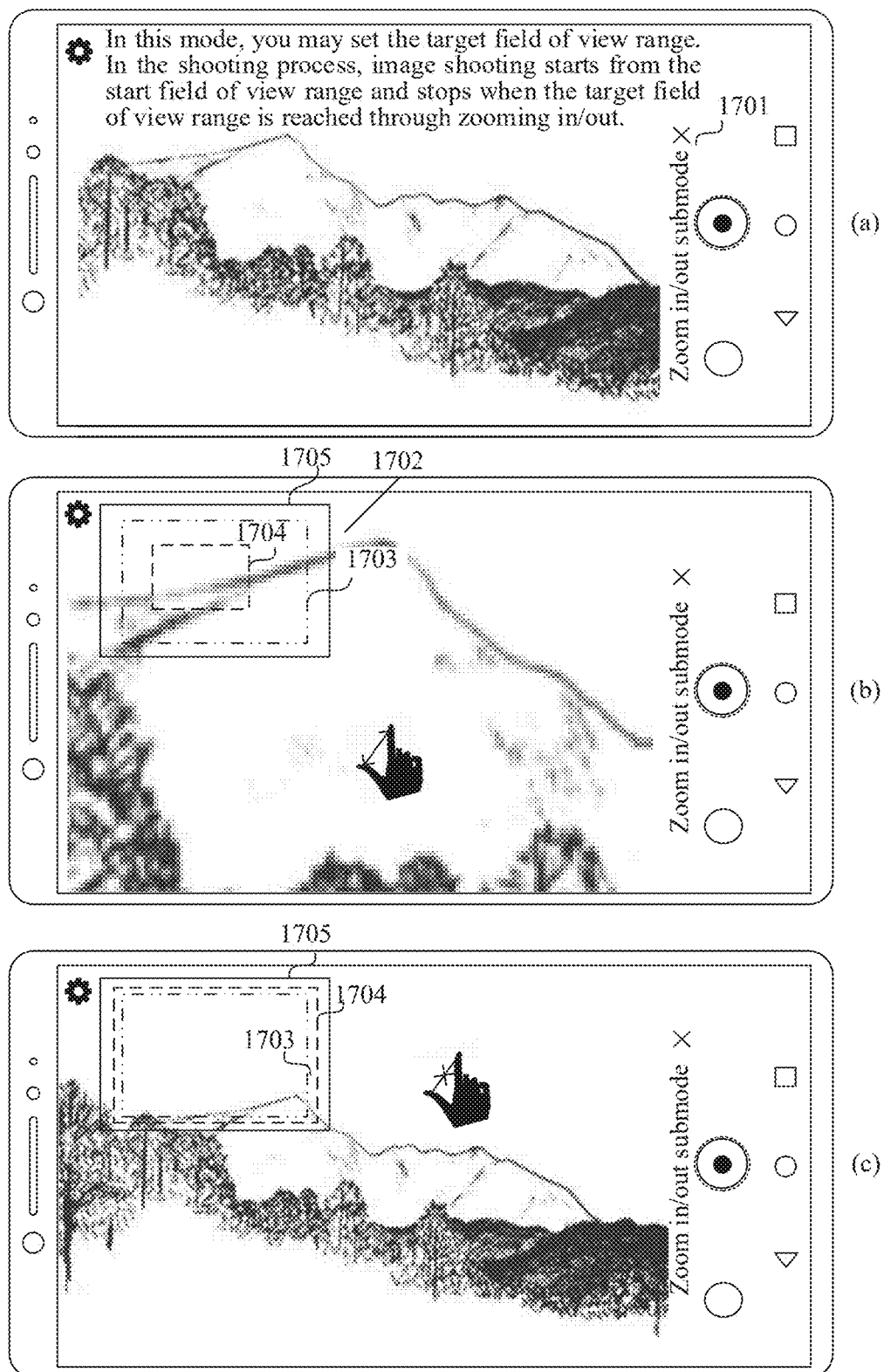
FIG. 17 is a schematic diagram of another group of interfaces according to an embodiment of this application.

In a preview state of the zoom in/out submode, if detecting an operation of tapping an exit control 1701 shown in (a) in FIG. 17 by the user, the mobile phone exits the zoom in/out submode. In a technical solution in which the mobile phone exits the movement submode, the mobile phone returns to the normal submode of time-lapse photography shown in (a) in FIG. 4. In another technical solution, the mobile phone returns to the shooting mode shown in FIG. 3(*b*).

The zoom in/out submode may be used to shoot a scene in which a to-be-shot field of view range is reduced or extended. For example, the to-be-shot field of view range is reduced from an entire city to a building, to provide a user with dynamic visual experience in which the field of view range is continuously reduced or extended. In some embodiments, after the zoom in/out submode is entered, the mobile phone may prompt the user with a function of the mode by displaying information, playing a voice announcement, or the like. For example, referring to (a) in FIG. 17, the mobile phone may prompt the user on the preview interface with "In this mode, you may set the target field of view range. In the shooting process, image shooting starts from the start field of view range and stops when the target field of view range is reached through zooming in/out."

1602: The mobile phone determines a start field of view range and a target field of view range of a target image in a shooting process.

After entering the zoom in/out submode, the mobile phone may capture images by using a camera with a large field of view (for example, a wide-angle camera or an ultra-wide-angle camera), and generate an original image. The mobile phone may display the generated original image on the preview interface.

In addition, after entering the zoom in/out submode, the mobile phone may determine a start field of view range and a final target field of view range to be reached through zooming in/out of the target image in the shooting process.

There may be a plurality of solutions in which the mobile phone determines the start field of view range and the target field of view range. The following separately describes the solutions.

Solution 1

After the zoom in/out submode is entered, the start field of view range is, by default, a field of view range of an original image displayed on the preview interface. Referring to (b) in FIG. 17, after detecting an operation of zooming in the original image by the user, the mobile phone displays a zoomed-in/out image on the preview interface, and a field of view range corresponding to the zoomed-in/out image is the target field of view range. When the start field of view range includes the target field of view range, the mobile phone may gradually reduce the field of view range of the target image from the start field of view range to the target field of view range in the shooting process; or when the target field of view range includes the start field of view range, the mobile phone may gradually extend the field of view range of the target image from the start field of view range to the target field of view range in the shooting process. There may be a plurality of operations performed by the user to zoom in/out the original image, for example, a zoom in/out operation with two fingers by the user, or an adjustment operation performed by the user on a zoom ratio control displayed on the preview interface. It should be noted that, if the field of view range of the image after zooming in/out by the user is consistent with the start field of view range, the mobile phone performs shooting in the normal submode.

In some embodiments, the preview interface may further include relative position information, for indicating a relative position relationship between the start field of view range and a maximum field of view range. For example, the relative position information may include a relative position relationship between a start box and a maximum range box. The start box corresponds to the start field of view range, and the maximum range box corresponds to the maximum field of view range that can be obtained by camera hardware of the mobile phone. After detecting a preset operation of the user, the mobile phone adjusts a zoom ratio of the preview image, where an adjusted field of view range of the preview image on the preview interface is the target field of view range. The mobile phone adds a target box to the relative position information, and the target box corresponds to the target field of view range. In this case, the relative position information includes a relative position relationship among the start box, the target box, and the maximum range box. The relative position information is for indicating a relative position relationship among the start field of view range, the target field of view range, and the maximum field of view range.

In some embodiments, the preview interface may further include relative position information, for indicating a relative position relationship between the target field of view range and the start field of view range. The relative position information may also be referred to as map information, position indication information, or the like. A name of the relative position information is not limited in embodiments of this application. For example, referring to (b) in FIG. 17, relative position information 1702 may include a start box 1703 and a target box 1704. A position and a size of the start box correspond to the start field of view range, and a position and a size of the target box correspond to the target field of view range. In addition, the relative position information may further include a maximum range box 1705, for indicating a maximum field of view range that can be obtained by the camera hardware of the mobile phone. After the mobile phone changes the target field of view range based on the operation of zooming in/out the original image by the user, the position or the size or both of the target box in the relative position information also change accordingly. In addition, the target box is smaller than or equal to the maximum range box, that is, the target field of view range is smaller than or equal to the maximum field of view range. In some embodiments, in the relative position information initially displayed by the mobile phone, the start field of view range is a preset field of view range, and the target field of view range is also a preset field of view range. For example, the initial target field of view range is smaller than the start field of view range, and the target box is within the start box. In another example, the initial target field of view range is consistent with the start field of view range, and the target box overlaps the start box.

In another example, after entering the zoom in/out submode, as shown in (c) in FIG. 17, after detecting an operation of zooming out the original image by the user, the mobile phone displays a zoomed-out image and relative position information on the preview interface, and a field of view range corresponding to the zoomed-out image is the target field of view range.

The start box, the target box, and the maximum range box may be displayed in different manners, to facilitate distinguishing by the user. For example, the start box, the target box, and the maximum range box may be distinguished by using different delays. In some embodiments, to help the user intuitively learn a meaning of each schematic box, the mobile phone may separately perform description on the preview interface.

In some embodiments, after determining the target field of view range, if the mobile phone subsequently detects a shooting operation of the user, the mobile phone performs shooting of time-lapse photography based on the target field of view range. In some other embodiments, the preview interface includes a confirmation control. After detecting an operation of tapping the confirmation control by the user, the mobile phone determines the target field of view range. After subsequently detecting the shooting operation of the user, the mobile phone performs shooting of time-lapse photography based on the target field of view range.

Solution 2

After the zoom in/out submode is entered, the start field of view range is, by default, a field of view range of an original image of the preview image displayed on the preview interface. The mobile phone may determine a position and a size of the target window, and a field of view range corresponding to the target window is the target field of view range.

Figure 18:
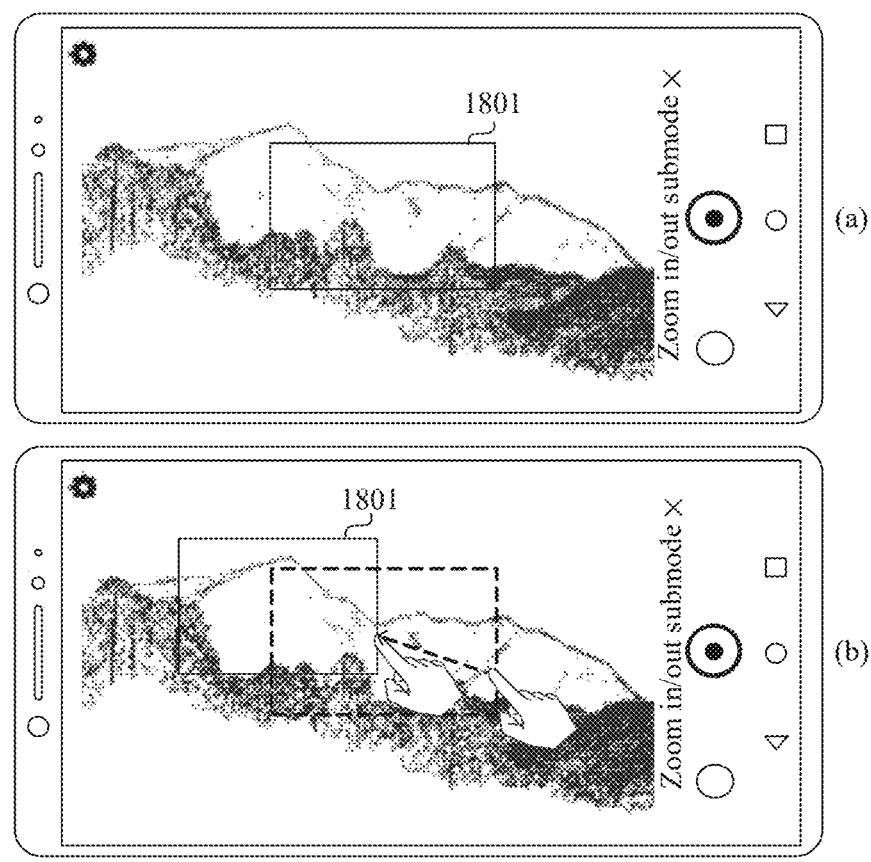
FIG. 18 is a schematic diagram of another group of interfaces according to an embodiment of this application.

In some embodiments, after entering the zoom in/out submode, referring to (a) in FIG. 18, the mobile phone automatically displays a target window 1801. The target window is located at any position on the original image, for example, located at a central position of the original image. Referring to (b) in FIG. 18, the mobile phone may change parameters such as a position and/or a size of the target window based on a setting operation of the user.

In some other embodiments, after entering the zoom in/out submode, the mobile phone does not automatically display the target window. In some technical solutions, the mobile phone may prompt, in a manner of displaying information, playing a voice, or the like, the user to set parameters such as a position and a size of the target window. A field of view range corresponding to the target window is a final field of view range after zooming in/out.

For example, after detecting a preset operation of the user, the mobile phone displays the target window on the preview interface. For example, in an implementation solution, after detecting a touch operation with two fingers on the screen by the user, the mobile phone displays the target window at a touch position of the fingers on the preview interface. In addition, as the distance between the two fingers of the user increases, the target window increases; and as the distance between the two fingers of the user decreases, the target window decreases. In addition, the mobile phone may further change a position of the target window in response to an operation of dragging the target window by the user. It should be noted that, in the zoom in/out submode, the zoom in/out operation with two fingers by the user changes the size of the target window rather than the zoom ratio of the preview image.

In another implementation solution, after detecting an operation of drawing a region on the preview interface by the user, the mobile phone displays the target window based on a track drawn by the user. An operation manner of setting the target window by the user is not limited in embodiments of this application.

In some embodiments, similar to the foregoing embodiments, the mobile phone may further display relative position information on the preview interface. A size and a position of the target box in the relative position information correspond to a size and a position of the target window relative to the original image and an image that is of the maximum field of view range and is obtained by hardware of the mobile phone.

In some embodiments, the mobile phone determines a target field of view range after detecting an operation of zooming in/out the original image by the user. If a shooting operation of the user is subsequently detected, shooting of time-lapse photography is performed based on the target field of view range. In some other embodiments, the preview interface includes a confirmation control. After detecting operations of zooming in/out the original image and tapping the confirmation control by the user, the mobile phone determines the target field of view range After subsequently detecting the shooting operation of the user, the mobile phone performs shooting of time-lapse photography based on the target field of view range.

Solution 3

After entering the zoom in/out submode, the mobile phone may determine positions and sizes of the start window and the target window. A field of view range corresponding to the position and the size of the start window is the start field of view range, and a field of view range corresponding to the position and the size of the target window is the target field of view range. In addition, the start window includes the target window, or the target window includes the start window.

Figure 19:
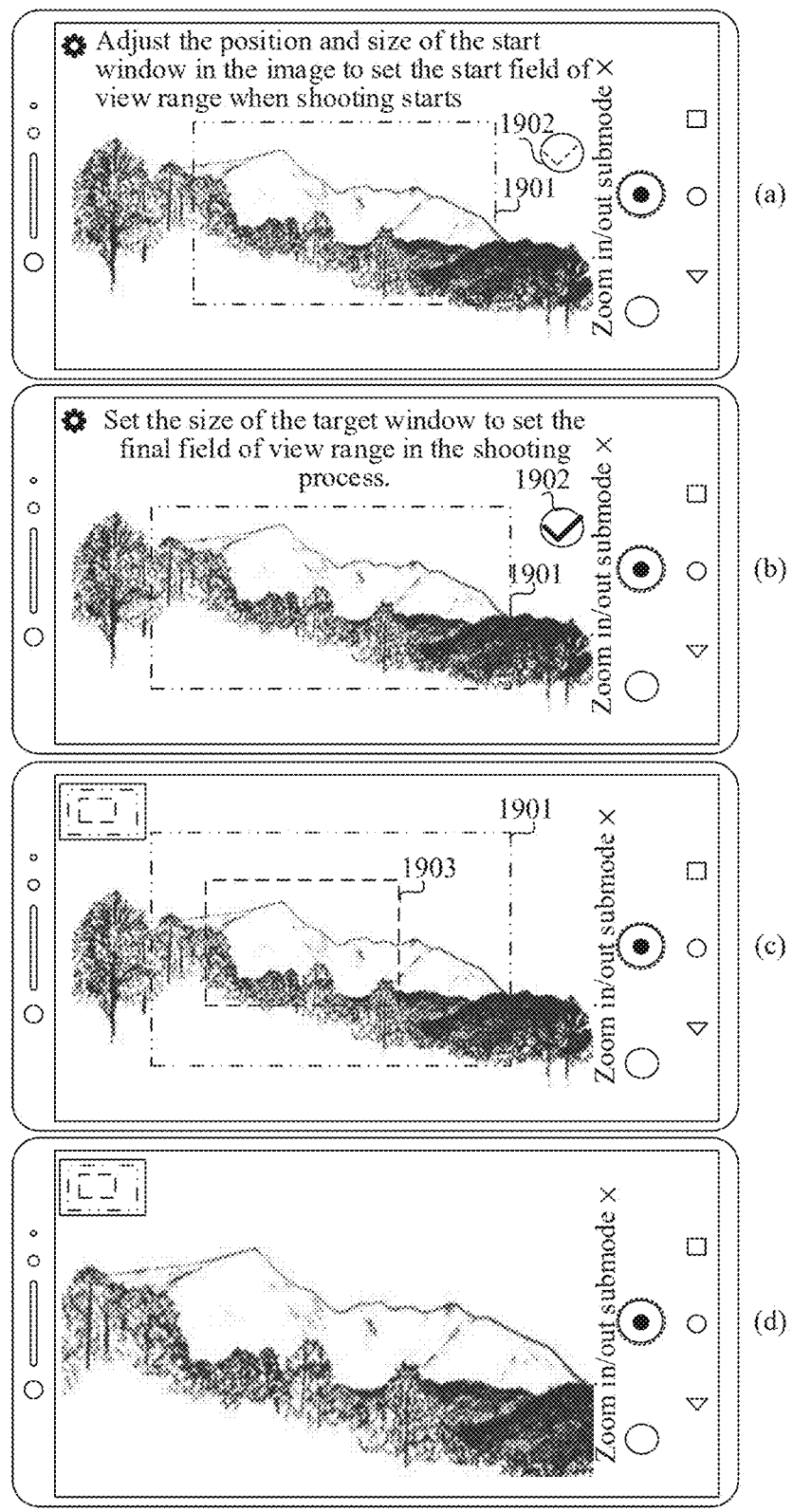
FIG. 19 is a schematic diagram of another group of interfaces according to an embodiment of this application.

In some implementations, after entering the zoom in/out submode, referring to (a) in FIG. 19, the mobile phone automatically displays a start window 1901 on an original image, and the original image corresponds to a maximum field of view range that can be obtained by hardware of the mobile phone. The start window is located at any position of the original image. For example, the start window overlaps the original image. As shown in (a) in FIG. 19, the mobile phone may further prompt the user with "Adjust the position and size of the start window in the image to set the start field of view range when shooting starts."

In some other implementations, after entering the zoom in/out submode, the mobile phone does not automatically display the start window. In some technical solutions, the mobile phone may prompt, in a manner of displaying information, playing a voice announcement, or the like, the user to set parameters such as a position and a size of a start window. A field of view range corresponding to the start window is an initial field of view range of an image when shooting just starts. The mobile phone may adjust and determine parameters such as a position and a size of the target window based on a setting operation of the user. For example, after detecting a preset operation of the user, the mobile phone displays the start window on the preview interface. For example, the preset operation may be a zoom in/out operation with two fingers by the user.

In addition, as shown in (a) in FIG. 19, the preview interface may further include a confirmation control 1902. After detecting an operation of tapping the confirmation control 1902 by the user, the mobile phone determines that a field of view range corresponding to the start window 1901 is the start field of view range.

Next, referring to (b) in FIG. 19, the mobile phone may further prompt the user with "Set the size of the target window to set the final field of view range in the shooting process." For descriptions of determining the target window by the mobile phone, refer to the descriptions in the foregoing embodiments. Details are not described herein again.

In some other implementations, after entering the zoom in/out submode, the mobile phone automatically displays the start window and the target window on the preview interface. The start window and the target window may be marked in different manners, to facilitate marking by the user. For example, the start window is red, and the target window is green. In another example, the start window is marked with a text "start window", and the target window is marked with a text "target window". The mobile phone may adjust and determine positions and sizes of the start window and the target window based on a setting operation of the user, to adjust the start field of view range and the target field of view range.

In some embodiments, the mobile phone may further display the relative position information on the preview interface. A size and a position of the start box in the relative position information correspond to a size and a position of the start window relative to the original image and an image that is of the maximum field of view range and is obtained by hardware of the mobile phone. A size and a position of the target box in the relative position information correspond to a size and a position of the target window relative to the original image and an image that is of the maximum field of view range and can be obtained by hardware of the mobile phone. For example, for a schematic diagram of a preview interface in this case, refer to (c) in FIG. 19. The preview interface includes a start window 1901, a target window 1903, and relative position information.

After determining the start field of view range and the target field of view range, in an implementation, the mobile phone still displays the original image in the maximum field of view range on the preview interface. In another implementation, as shown in (d) in FIG. 19, the mobile phone displays, on the preview interface, an image in the start field of view range on the original image.

In addition, the mobile phone may further determine a target speed of zooming in/out in the zoom in/out submode. In a shooting process, the mobile phone may reduce/extend the field of view range of the target image from the start field of view range to the target field of view range at the target speed.

For example, in some technical solutions, the target speed is a preset fixed value; or the target speed is related to a current shooting scene, and different shooting scenes correspond to different target speeds.

Figure 20:
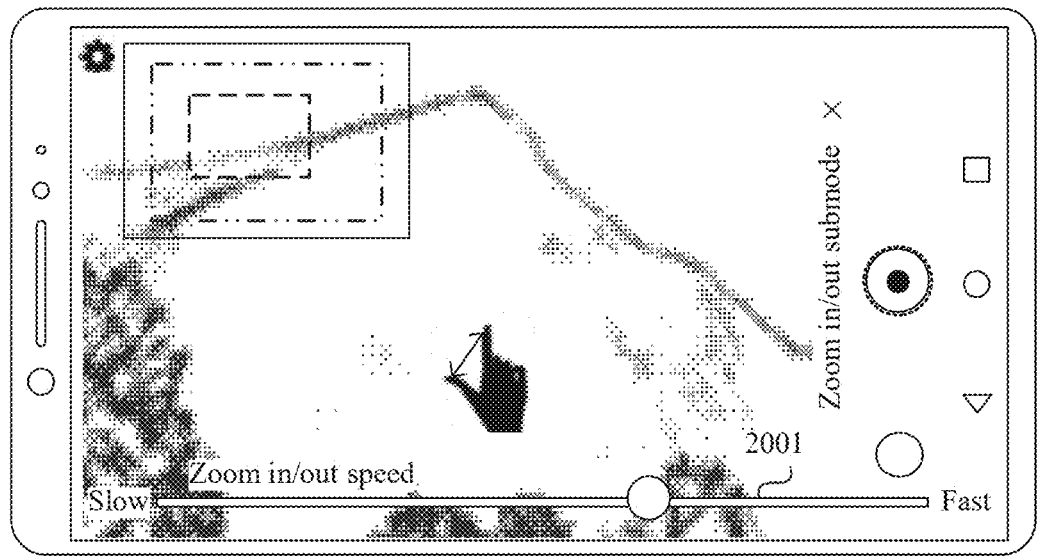
FIG. 20 is a schematic diagram of another interface according to an embodiment of this application.

In some other technical solutions, a zoom in/out speed adjustment control is displayed on the preview interface, and the zoom in/out speed adjustment control is configured to set a target speed at which the field of view range of the target image is reduced/extended from the start field of view range to the target field of view range in the shooting process. For example, the moving speed adjustment control may be a control 2001 shown in FIG. 20. The user may perform left/right dragging on the control 2001. When the position of dragging by the user is closer to the right, the target speed is faster. When the position of dragging by the user is closer to the left, the target speed is slower. The target speed may be represented by a quantity of pixels that a vertex of the target image moves per unit time in a zoom in/out process.

1603: After detecting the shooting operation of the user, the mobile phone displays the recorded images on the shooting interface, and performs shooting of time-lapse photography based on the start field of view range and the target field of view range.

It may be understood that the mobile phone may perform shooting of time-lapse photography in response to an operation such as a touch operation, a voice instruction, or a shortcut gesture of the user. A shooting operation of triggering the mobile phone to start shooting of time-lapse photography is not limited in embodiments of this application.

In a shooting process, the camera of the mobile phone continuously captures images based on a parameter such as a capture interval of time-lapse photography, to generate an original image. After detecting the shooting operation of the user, the mobile phone first displays, on the shooting interface as a target image, an image that is in the start field of view range and is on the first frame of original image obtained by the mobile phone. The target image is a recorded image. Subsequently, the mobile phone reduces/extends the field of view range of the target image from the start field of view range at the target speed, and stops shooting after the field of view range of the target image is reduced/extended to the target field of view range. When the start field of view range includes the target field of view range, the mobile phone may change, on the original image at the target speed, coordinate positions of four vertices of the target image toward a central point of the target field of view range, to implement a process of reducing the field of view range. When the target field of view range includes the start field of view range, the mobile phone may separately change, on the original image at the target speed, coordinate positions of the four vertices of the target image toward the four vertices of the target field of view range, to implement a process of extending the field of view range.

In some embodiments, in a shooting process, every time one frame of original image is obtained, the mobile phone may change a field of view range and a coordinate range of the target image once. In other words, coordinate positions of the target image on adjacent original images are different, that is, the coordinate positions of the target image on the adjacent original images are changed. Therefore, the target speed v of the target image may also be a quantity of pixels that the coordinate position of the target image moves on two adjacent frames of original images. In other words, the target speed may be a quantity of pixels that the target image moves on each frame of original image, or the target speed may be briefly referred to as a quantity of pixels that the target image moves on each frame of original image.

Figure 21:
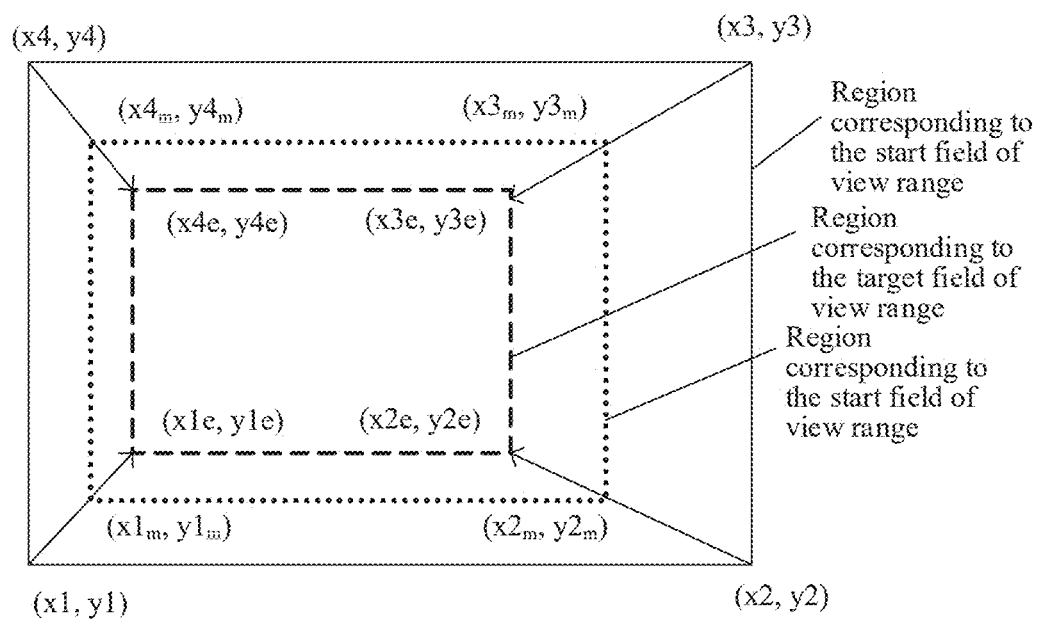
FIG. 21 is a schematic diagram of a coordinate change of a target image according to an embodiment of this application.

Specifically, referring to FIG. 21, it is assumed that vertex coordinates of a region corresponding to a start field of view range on an original image are respectively (x1, y1), (x2, y2), (x3, y3), and (x4, y4), vertex coordinates of a region corresponding to a target field of view range on the original image are respectively (x1e, y1e), (x2e, y2e), (x3e, y3e), and (x4e, y4e), an area of an image region corresponding to the start field of view range is S1 (that is, S1 pixels are included), and an area of an image region corresponding to the target field of view range is S2 (that is, S2 pixels are included). In a shooting process, vertex coordinates of the target image on an $m^{th}$ frame of original image are respectively (x1m, y1m), (x2m, y2m), (x3m, y3m), and (x4m, y4m). In this case, vertex coordinates of the target image on an $(m+1)^{th}$ frame of original image are respectively (x1m+1, y1m+1), (x2m+1, y2m+1), (x3m+1, y3m+1), and (x4m+1, y4m+1), x1m+1=x1m+(x1e−x1)*c or x1m+1=x1+(x1e−x1)*c*m. A vertex coordinate of the target image on the $m^{th}$ frame of original image is x1m=x1+(x1e−x1)*c*(m−1), v represents the target speed, that is, a quantity of pixels that a coordinate of a same vertex of the target image moves on two adjacent frames of original image, or a quantity of pixels that a coordinate of a same vertex of the target image moves on two adjacent frames of recorded image; and c=(S2−S1)/v, and c represents a zoom in/out ratio of the field of view range of the target image for each frame of original image at the target speed v. When a vertex coordinate obtained by the mobile phone through calculation is a decimal, because the mobile phone performs zooming in/out with a pixel as a unit, the mobile phone performs rounding. In addition, calculation methods for the coordinate y1m+1 and coordinates of other vertices of the target image on the $(m+1)^{th}$ frame of original image are similar, and details are not described again.

It should be noted that when the start field of view range and the target field of view range have a same center, and the start box and the target box are concentric boxes, four vertices of the target image correspond to a same v value and a same c value, that is, moving speeds of the four vertices of the target image are the same. When the start field of view range and the target field of view range have different centers, and the start box and the target box are not concentric boxes, v includes four components v1, v2, v3, and v4 that respectively correspond to the four vertices. To enable the four vertices of the target image to reach the four vertices of the region corresponding to the target field of view range at the same time, extension/reduction is respectively performed on the four vertices of the target image toward the target field of view range by using respective corresponding speed components.

The mobile phone crops the $m^{th}$ frame of original image to obtain the target image. The mobile phone displays, on the shooting interface, the target image obtained based on the $m^{th}$ frame of original image, so that a size of the target image is consistent with a size of the original image in the preview state. When the size of the target image obtained by cropping is larger than the size of the original image in the preview state, the mobile phone may insert pixels into the target image, to set the size of the target image to be consistent with that of the original image in the preview state and display the target image. When the size of the target image obtained by cropping is smaller than the size of the original image in the preview state, the mobile phone may extract pixels from the target image, to set the size of the target image to be consistent with the size of the original image in the preview state. The mobile phone saves the target image, to generate a time-lapse photography video based on the target image.

Figure 22:
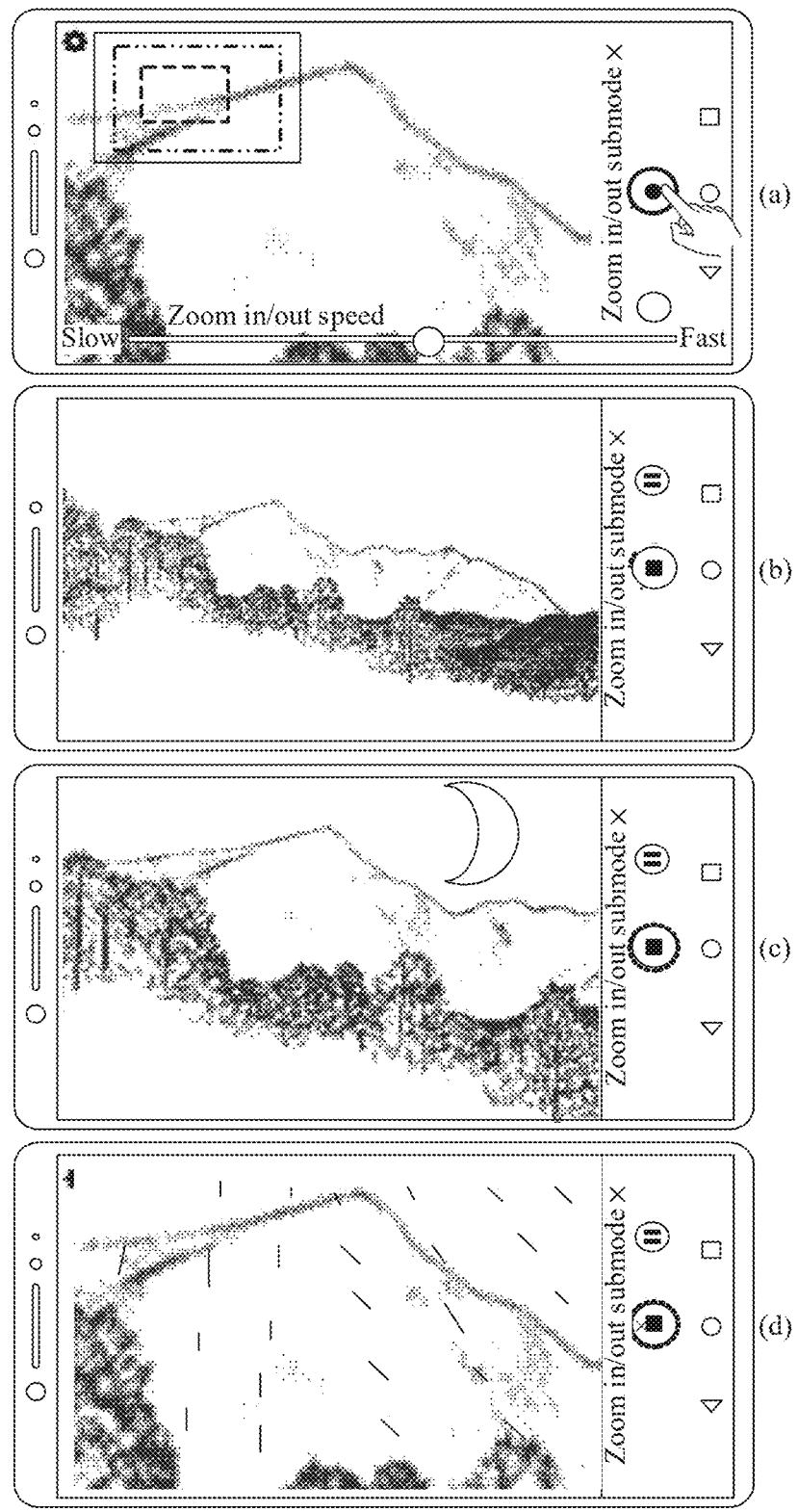
FIG. 22 is a schematic diagram of another group of interfaces according to an embodiment of this application.

In some embodiments, in a shooting process, the mobile phone displays the target image on the shooting interface, and no longer displays the relative position information. For example, after detecting a shooting operation shown in (a) in FIG. 22, the mobile phone may display shooting interfaces shown in (b) to (d) in FIG. 22.

Figure 23:
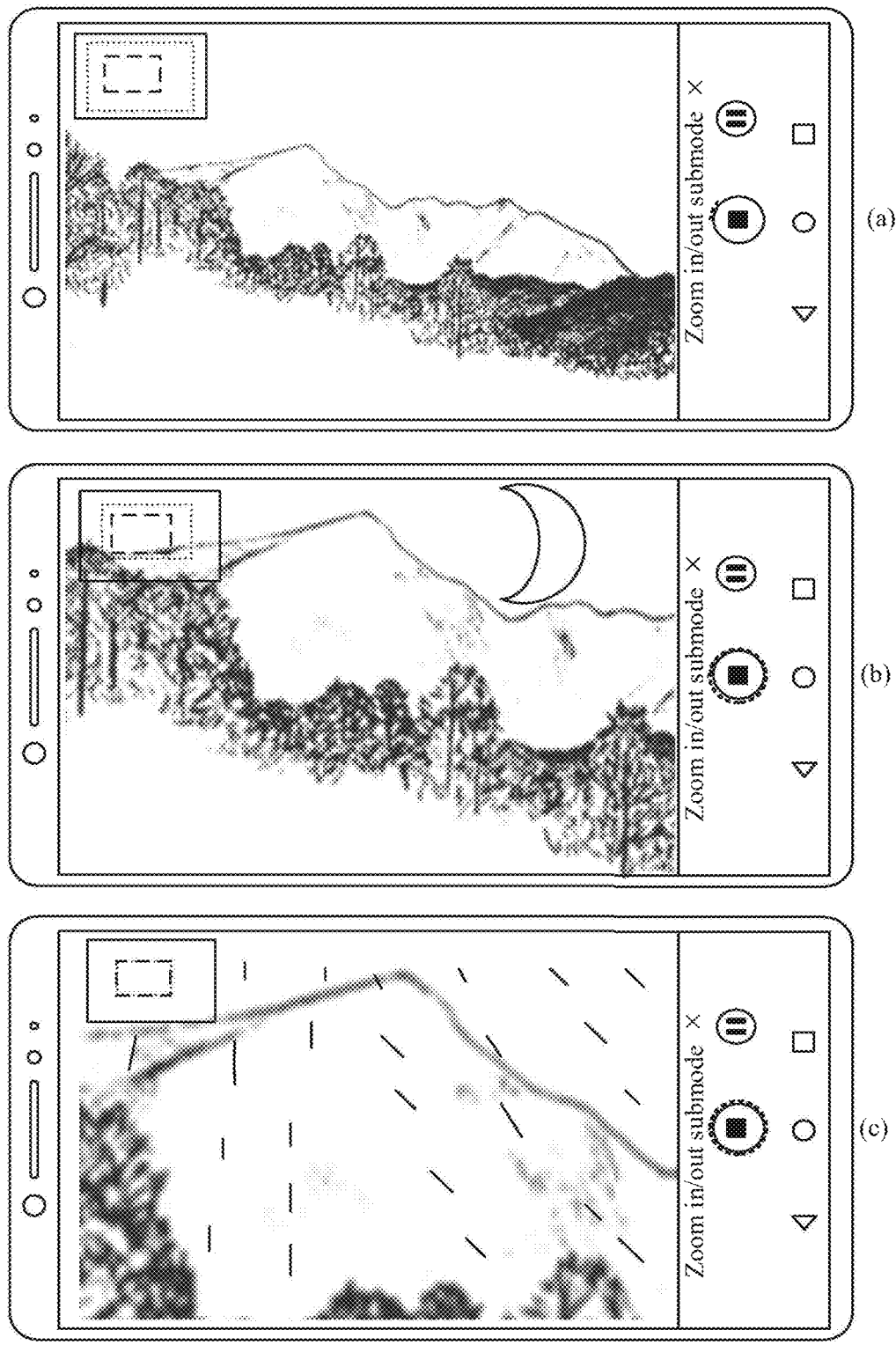
FIG. 23 is a schematic diagram of another group of interfaces according to an embodiment of this application.

In some other embodiments, the mobile phone may continuously display relative position information on the shooting interface. The relative position information indicates a relative relationship among a real-time field of view range corresponding to the target image, a target field of view range, and a maximum field of view range, so that the user learns a current shooting position and shooting progress in real time. For example, the mobile phone may display shooting interfaces shown in (a) to (c) in FIG. 23. The shooting interface includes relative position information, and the relative position information includes a target box (that is, the dashed box shown in the figure), a recording box (that is, the dotted box shown in the figure), and a maximum range box (that is, the solid box shown in the figure). The recording box corresponds to the real-time field of view range of the target image. Compared with the relative position information on the preview interface, the start box on the shooting interface is replaced with a recording box.

Similar to the movement submode, in the zoom in/out submode, the mobile phone may perform electronic image stabilization by cutting a frame around the target image, to ensure clarity and stability of the target image when the mobile phone shakes. In addition, in a shooting process, the mobile phone may detect a shake amplitude of the mobile phone. If the shake amplitude exceeds a preset threshold, the mobile phone may prompt the user that the picture shakes excessively and stops shooting. In a shooting process, if the mobile phone detects a pause operation of the user, the mobile phone pauses shooting of time-lapse photography. After detecting the shooting operation of the user, the mobile phone continues with the previous process to continue to perform shooting.

1604: After stopping shooting, the mobile phone generates a time-lapse photography video.

After detecting a shooting stop operation of the user, the mobile phone stops shooting of time-lapse photography, and generates a time-lapse photography video. Alternatively, if the field of view range that is of the target image and is determined by the mobile phone in the shooting process is consistent with the target field of view range, shooting is stopped, and the time-lapse photography video is generated.

Video images in the time-lapse photography video generated by the mobile phone are target images in the shooting process. For example, in the case shown in FIG. 22, after shooting is stopped, as shown in (a) in FIG. 24, the mobile phone generates a thumbnail 2401. An image in the thumbnail is a target image determined by the mobile phone in the shooting process.

In some embodiments of this application, in the shooting process, the mobile phone locally calculates a coordinate position of the target image, crops the target image from the original image, displays the target image, and generates a final time-lapse photography video. In some other embodiments, because a processing process of time-lapse photography needs to occupy large memory, a processing capability of the mobile phone may be improved by using a cloud. For example, in a shooting process, an original image obtained by the mobile phone may be uploaded to the cloud. A coordinate position of the target image is calculated by using the cloud, the target image is cropped from the original image based on the coordinate position, and a size of the target image is adjusted. Processing such as image definition enhancement may be further performed, so that each target image in the shooting process is sent to the mobile phone for display. The cloud may further generate a time-lapse photography video based on the target image, and send the time-lapse photography video to the mobile phone for saving.

1605: After detecting a play operation of the user, the mobile phone plays the time-lapse photography video.

Figure 24:
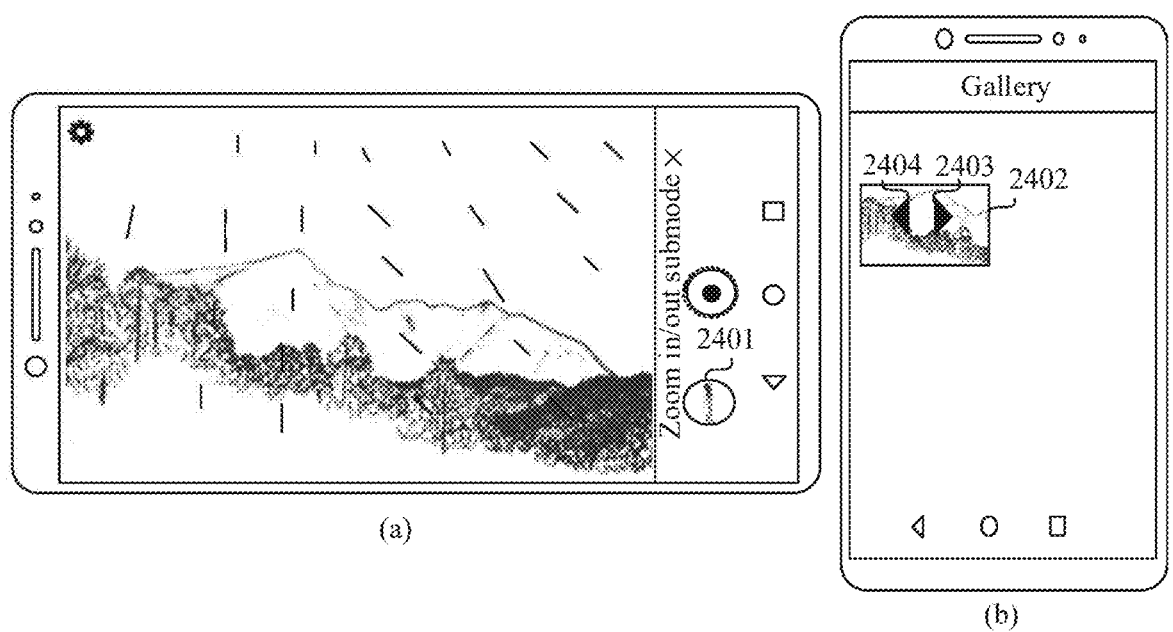
FIG. 24 is a schematic diagram of another group of interfaces according to an embodiment of this application.
Figure 25:
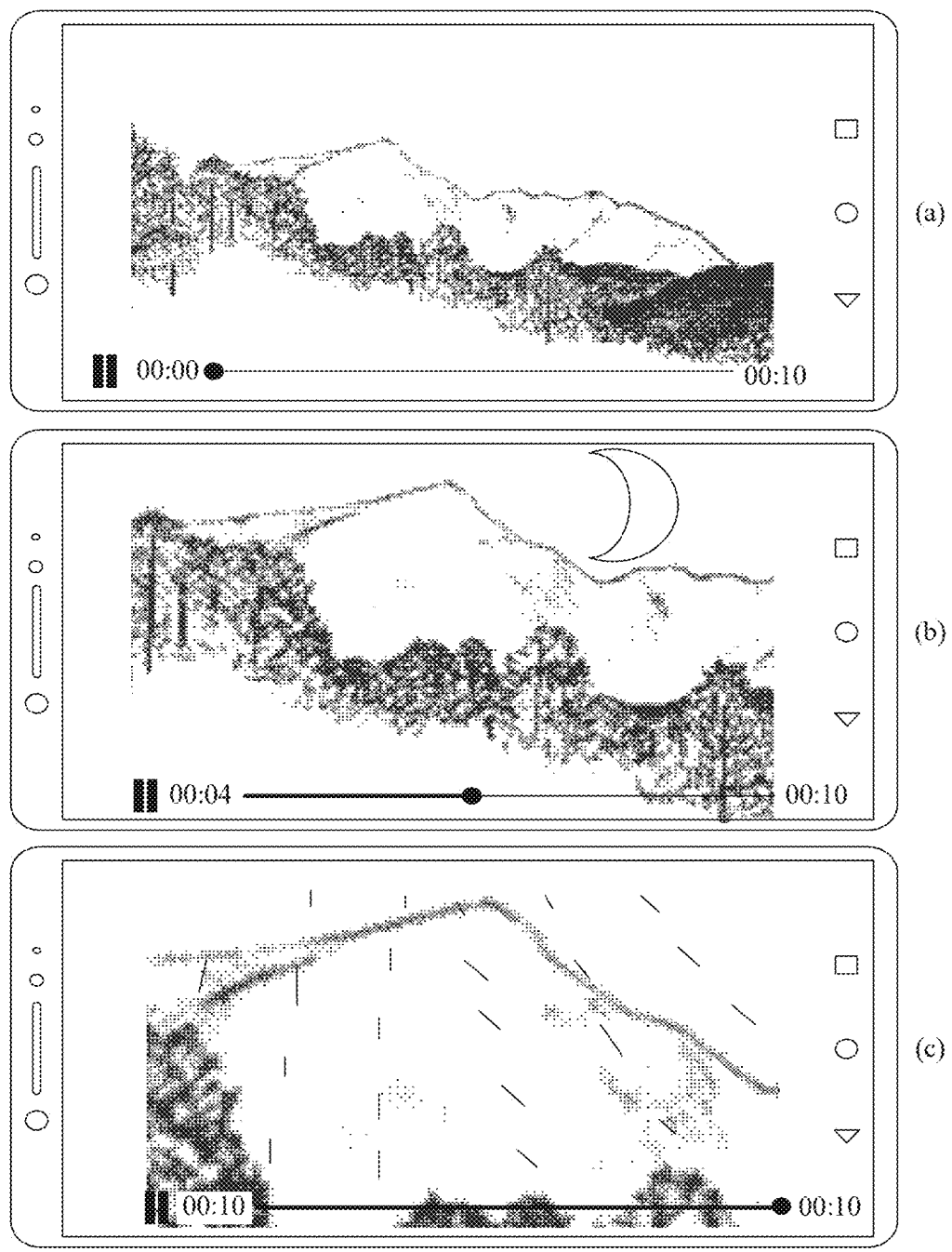
FIG. 25 is a schematic diagram of another group of interfaces according to an embodiment of this application.

For example, referring to (b) in FIG. 24, the mobile phone saves a generated time-lapse photography video 2402 in a gallery. After detecting an operation of tapping a play control 2403 by the user, the mobile phone plays the time-lapse photography video 2402, and displays schematic diagrams of play interfaces shown in (a) to (c) in FIG. 25. The video images displayed on the play interfaces are target images determined by the mobile phone in a shooting process, and sizes of the video images are the same as a size of an original image in a preview state. FIG. 25 shows a change process from a mountain scenery view in a large field of view to a peak scenery view in a small range.

Figure 26:
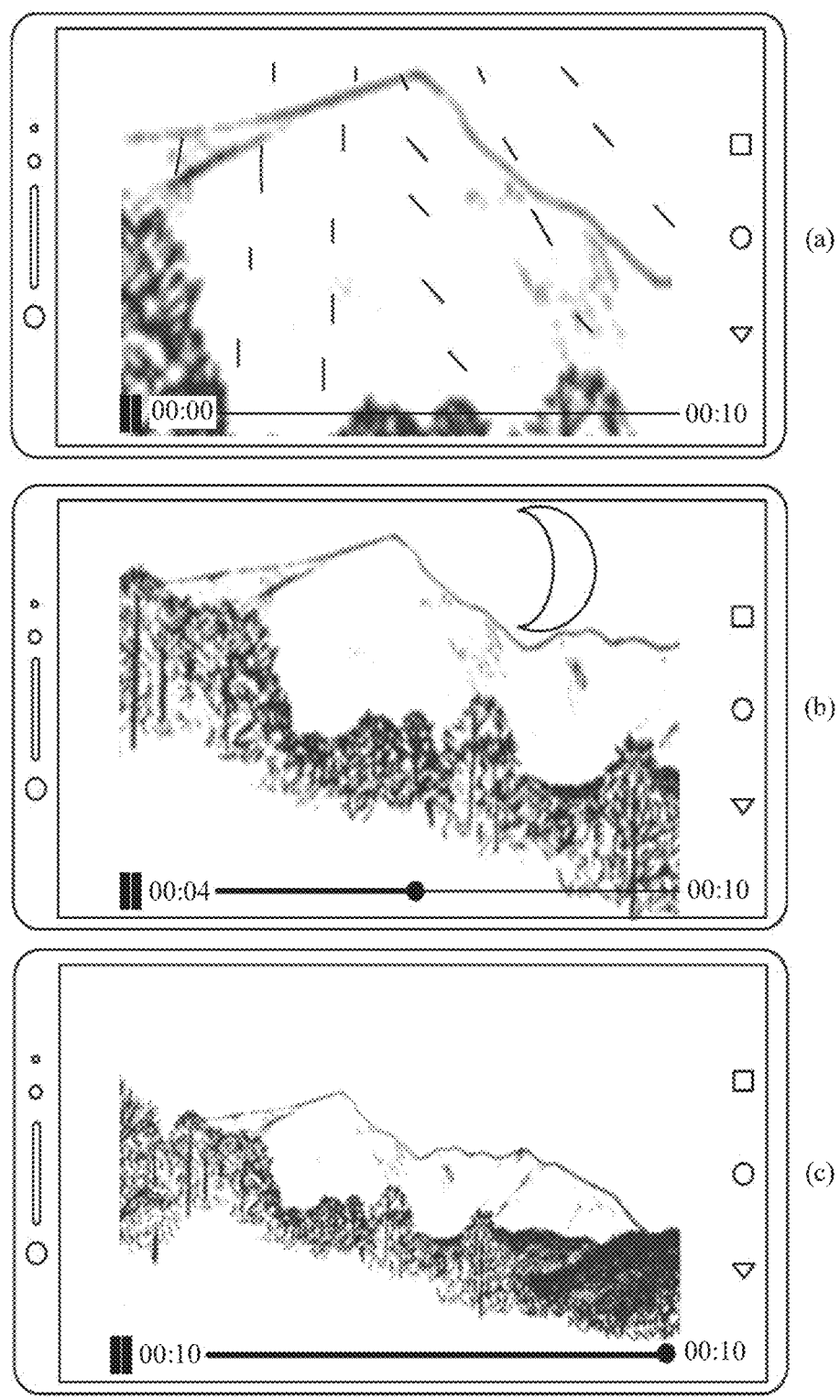
FIG. 26 is a schematic diagram of another group of interfaces according to an embodiment of this application.

In some other embodiments, the time-lapse photography video generated by the mobile phone in the zoom in/out mode may be played in reverse order, to present a reverse process of a shooting process to the user. For example, in a shooting process, an object in a field of view range that changes from a large range to a small range is shot, and in a play process, an object in a field of view range that changes from a small range to a large range is demonstrated. In another example, in a shooting process, a change from a field of view range of an entire city to a field of view range corresponding to a building is shot; and in a play process, a change from the field of view range corresponding to the building to the field of view range of the entire city is demonstrated. For example, after detecting an operation of tapping the play control 2404 by the user, the mobile phone plays the time-lapse photography video 2402 in reverse order, and displays schematic diagrams of play interfaces shown in (a) to (c) in FIG. 26. FIG. 26 shows a change process from a peak scenery view in a small range to a mountain scenery view in a large field of view range.

It should be noted that aspect ratios of regions corresponding to the start field of view range and the target field of view range on the original image and an aspect ratio of the target image are the same as an aspect ratio of the original image. In addition, sizes of the target images displayed on the shooting interface and the play interface are consistent with a size of the original image in the preview state. In this way, in a zoom in/out process, sizes of the target images displayed on the shooting interface and the play interface by the mobile phone are consistent with a size of the original image displayed on the preview interface, so that the user can be provided with good visual experience.

In some other embodiments, the mobile phone includes a long-focus camera with a small field of view, and a shooting range of the long-focus camera may change with rotation of the camera. In embodiments of this application, the long-focus camera may rotate correspondingly based on the target direction and the target speed, so that the long-focus camera can capture the target image in a zoom in/out process in real time. In this way, the target images on the preview interface shooting interface may be obtained based on the images captured by the long-focus camera. Similar to the foregoing movement submode, because the field of view range of the long-focus camera is small, pixel density of the captured image is greater than pixel density of the image captured by the camera with a large field of view range. Therefore, when the target image is obtained based on the image captured by the long-focus camera, a cropping range is small or cropping is not required, the target image includes a large quantity of original pixels on the original image, and a small quantity of pixels are inserted when the target image is enlarged to have a size consistent with that of the original image in the preview state. Therefore, the generated video image is clearer.

In the zoom in/out mode, in a shooting process of time-lapse photography, the mobile phone may automatically adjust a field of view range of a target image based on the target field of view range, to automatically adjust a to-be-recorded shooting range of a video without using an external apparatus such as a guide rail to perform an operation such as tracking on a lens and without manually adjusting the shooting range by the user in real time. This can help the user shoot a scene in which a to-be-shot range requires zooming in/out, to provide the user with dynamic video experience in which a size of a field of view range constantly changes.

In some other embodiments of this application, a parameter such as a field of view range, a target field of view range, or a target speed of the target image in a shooting process is variable in the shooting process. In this way, the user can adjust the related parameters of the target image at any time in a shooting process, to obtain a target image and a video image that dynamically change, thereby meeting a personalized shooting requirement of the user and improving shooting experience of the user. For example, in a shooting process, when the user wants to record different scenery scenes in a same time-lapse photography video, the user may move the mobile phone to another scenery scene, and may further adjust a related parameter of the target image, to perform video recording by using a parameter that matches a new scenery scene.

For example, in a shooting process, after detecting a zoom in/out operation on the shooting interface by the user, the mobile phone correspondingly adjusts the field of view range of the current frame or the next frame of target image on the shooting interface. In a subsequent shooting process, the field of view range of the target image changes from the adjusted field of view range to the target field of view range.

Figure 27A:
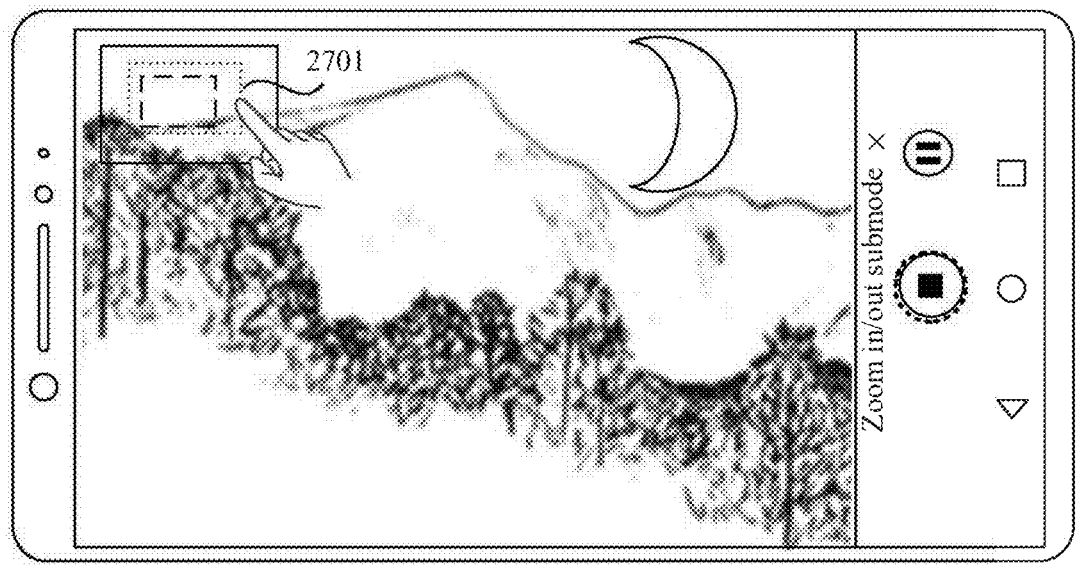
FIG. 27A is a schematic diagram of another interface according to an embodiment of this application.

In another example, after detecting an operation of adjusting a size or a position of a recording box 2701 in relative position information on a shooting interface shown in FIG. 27A by the user, the mobile phone may correspondingly adjust the field of view range of the current frame or the next frame of target image based on the adjusted recording box. After detecting the operation of adjusting the size or the position of the target box in the relative position information on the shooting interface by the user, the mobile phone may correspondingly adjust the target field of view range based on the adjusted target box.

In another example, the mobile phone may automatically display a zoom in/out speed adjustment control on the shooting interface or display a zoom in/out speed adjustment control after detecting a preset operation of the user, so that the user can conveniently adjust the target speed in a shooting process.

Figure 27B:
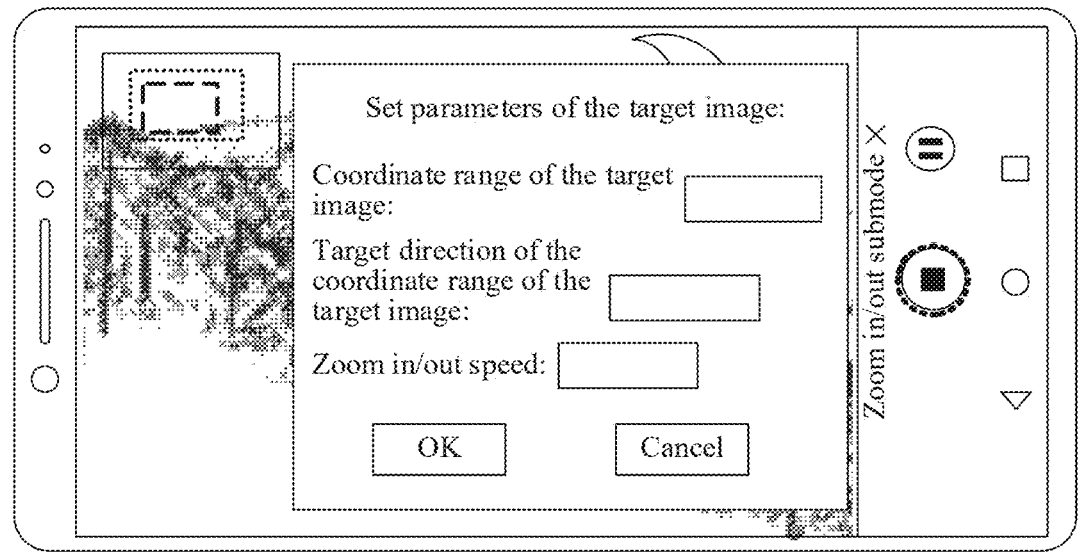
FIG. 27B is a schematic diagram of another interface according to an embodiment of this application.

In another example, after detecting a preset operation of the user, the mobile phone displays a zoom in/out adjustment interface on the shooting interface. The zoom in/out adjustment interface may be used to adjust parameters such as a field of view range (for example, a coordinate range may be adjusted) of a current frame or a next frame of target image, a target field of view range (for example, a coordinate range may be adjusted), or a target speed. For example, for a schematic diagram of the zoom in/out adjustment interface, refer to FIG. 27B.

It may be understood that the foregoing preset operations used to trigger different operations may be different.

In some embodiments of this application, in a shooting process of time-lapse photography, as a size of a moving window changes or a field of view range of a target image changes, the mobile phone may switch a camera configured to capture an image in the shooting process.

For example, in a shooting process of the movement submode, when the moving window is small or becomes smaller, the mobile phone may capture an image by using a camera (for example, a long-focus camera or a macro camera) with a small field of view. Because the field of view of the long-focus camera or the like is small, pixel density of the captured image is greater than pixel density of the image captured by the camera with a large field of view. Therefore, when the target image in the moving window is obtained based on the image captured by the long-focus camera, a cropping range is small or cropping is not required, the target image in the moving window includes a large quantity of original pixels on the original image, and a small quantity of pixels are inserted when the mobile phone enlarges the target image to a size of the original image. Therefore, the generated video image is clearer. When the moving window is large or becomes larger, the mobile phone may capture an image by using a camera (for example, a wide-angle camera or an ultra-wide-angle camera) with a large field of view.

In another example, in a shooting process of the zoom in/out submode, when a field of view range of the target image is small or becomes smaller, the mobile phone may capture an image by using a camera (for example, a long-focus camera or a macro camera) with a small field of view. Because the field of view of the long-focus camera or the like is small, pixel density of the captured image is greater than pixel density of the image captured by the camera with a large field of view. Therefore, when the target image is obtained based on the image captured by the long-focus camera, a cropping range is small or cropping is not required, the target image includes a large quantity of original pixels on the original image, and a small quantity of pixels are inserted when the mobile phone enlarges the target image to a size of the original image. Therefore, the target image displayed on the shooting interface is clearer, and the generated video image is clearer. When the field of view range of the target image is large or becomes larger, the mobile phone may capture an image by using a camera (for example, a wide-angle camera or an ultra-wide-angle camera) with a large field of view.

In some other embodiments, the mobile phone may perform shooting of time-lapse photography in a normal submode, and generate a time-lapse photography video 0. The mobile phone may perform moving editing on video images in the time-lapse photography video 0, to generate a time-lapse photography video in which the video images obtained in the foregoing movement submode are target images. The mobile phone may further perform zoom in/out editing on video images in the time-lapse photography video 0, to generate a time-lapse photography video in which the video images obtained in the foregoing zoom in/out submode are target images.

In some other embodiments of this application, the time-lapse photography mode includes a zoom in (zoom in) mode and a zoom out (zoom out) mode.

In the zoom in mode, the mobile phone may determine the target field of view range based on a setting operation of the user, or determine the target field of view range and the start field of view range, and the target field of view range is smaller than the start field of view range. In a shooting process, the mobile phone gradually reduces the field of view range corresponding to the target image starting from the start field of view range, and shooting is stopped when the field of view range is reduced to the target field of view range.

In the zoom out mode, the mobile phone may determine the target field of view range based on a setting operation of the user, or determine the target field of view range and the start field of view range, and the target field of view range is larger than start field of view range. In a shooting process, the mobile phone gradually extends the field of view range corresponding to the target image starting from the start field of view range, and shooting is stopped when the field of view range is extended to the target field of view range.

In some other embodiments of this application, the time-lapse photography mode includes a regression mode. In a shooting process of the regression mode, the mobile phone may determine the target field of view range, or determine the target field of view range and the start field of view range based on a setting operation of the user. In a shooting process, the mobile phone gradually reduces/extends the field of view range corresponding to the target image starting from the start field of view range until the field of view range is reduced/extended to the target field of view range, and then extends/reduces the field of view range of the target image starting from the target field of view range to the start field of view range.

In some other embodiments, the zoom in/out submode includes an overlay mode. In the overlay mode, the user may set a zoom in+zoom out mode or a zoom out+zoom in mode. For example, in the zoom in+zoom out mode, the mobile phone may determine a target field of view range of zoom in based on a setting operation of the user. The target field of view range is a start field of view of zoom out. The mobile phone may further determine a target field of view range of zoom out based on a setting operation of the user. In a shooting process, the mobile phone reduces the field of view range of the target image starting from the start field of view range of zoom in, until the field of view range of the target image is reduced to the target field of view range of zoom in, and then extends the field of view range of the target image starting from the start field of view range of zoom in. For example, in a shooting process of the regression mode, the mobile phone first shoots a change process from a field of view range of an entire city to a field of view range corresponding to a building in the city, and then continues to shoot a change process from the field of view range corresponding to the building to the field of view range of the entire city.

In some other embodiments of this application, the time-lapse photography mode includes a combined mode. In some technical solutions, the combined mode includes a translation mode+a zoom in/out mode, and the mobile phone may move the target image or zoom in/out the target image in a shooting process. For example, in a preview state of the time-lapse photography mode, the mobile phone displays an initial preview image on a preview interface. After detecting a zoom in/out operation of the user, the mobile phone displays a main window 2800 shown in FIG. 28 on the preview interface. The mobile phone may further adjust a position and a size of the main window based on an operation of the user.

Figure 28:
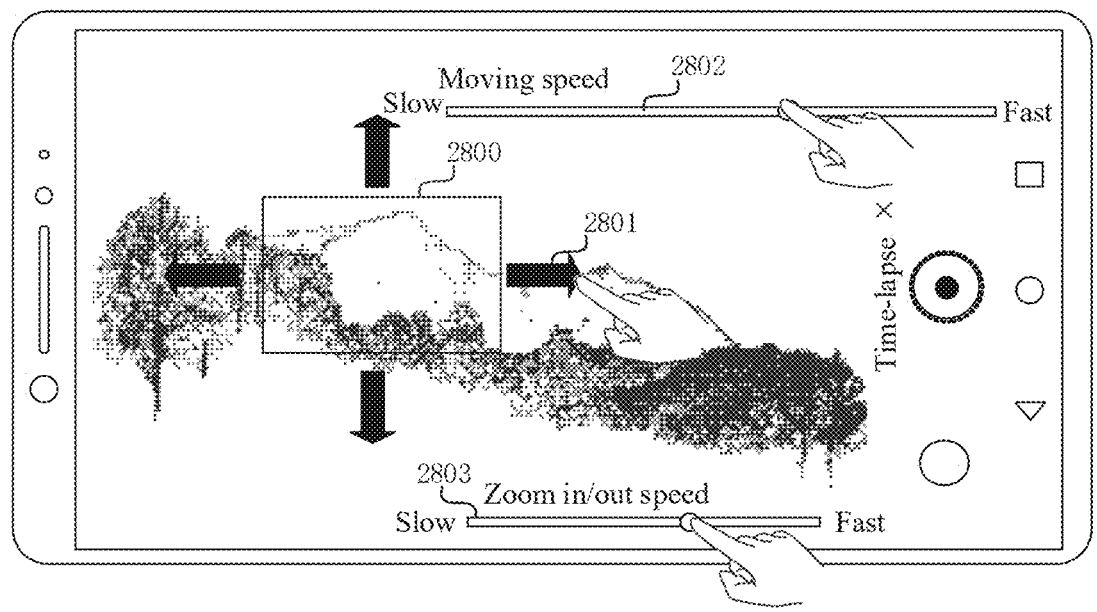
FIG. 28 is a schematic diagram of another interface according to an embodiment of this application.

In addition, the preview interface further includes a direction control, for example, arrows with different directions shown in FIG. 28. As shown in FIG. 28, after detecting an operation of tapping a direction control 2801 by the user, the mobile phone determines that a movement direction of the main window 2800 in a shooting process is a direction indicated by the direction control 2801, and the mobile phone is currently in a movement mode. As shown in FIG. 28, the preview interface further includes a moving speed adjustment control 2802, configured to set a target speed at which the main window moves in a target direction in the shooting process. After shooting starts, the mobile phone displays an original image obtained in real time and a main window. The main window moves in a target direction at a target speed corresponding to the moving speed adjustment control, and stops shooting after the main window reaches a boundary of the original image, and generates a time-lapse photography video. Images in the time-lapse photography video are target images in the main window in the shooting process.

As shown in FIG. 28, the preview interface further includes a zoom in/out speed adjustment control 2803. If the user sets a target zoom in/out speed by using the zoom in/out speed adjustment control but does not operate the direction control and the moving speed adjustment control, the current mode is the zoom in/out mode. A field of view range corresponding to the initial preview image is a start field of view range of the target image in a shooting process, and a field of view range corresponding to the main window is a target field of view range corresponding to the target image when shooting ends. The field of view range corresponding to the main window is a field of view range that the user eventually wants to shoot, and an object in the main window is subject content that the user eventually wants to shoot. In other words, the user may set a field of view range or subject content that the user eventually wants to obtain through shooting. After shooting starts, the mobile phone displays the target image on the shooting interface, and a field of view range of the target image changes from the start field of view range to the target field of view range. After the field of view range of the target image changes to the target field of view range, the mobile phone stops shooting, to generate a time-lapse photography video. Images in the time-lapse photography video are target images in a shooting process.

In some other technical solutions, in the combined mode, a time-lapse photography video shot by the mobile phone may include a plurality of sub-videos, and different sub-videos may correspond to different submodes. For example, the user may set that a to-be-shot time-lapse photography video includes three sub-videos, which respectively correspond to the zoom in mode, the zoom out mode, and the movement mode. In a shooting process, the mobile phone may first extend the field of view range of the target image, then reduce the field of view range of the target image, then move the target image, and stop shooting when the target image reaches a boundary of the original image.

It may be understood that, to implement the foregoing functions, the electronic device includes a corresponding hardware and/or software module for performing each function. Algorithm steps in the examples described with reference to embodiments disclosed in this specification can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application in combination with the embodiments, but it should not be considered that the implementation goes beyond the scope of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments of this application, division into the modules is an example and is merely logical function division, and may be other division in an actual implementation.

Figure 29:
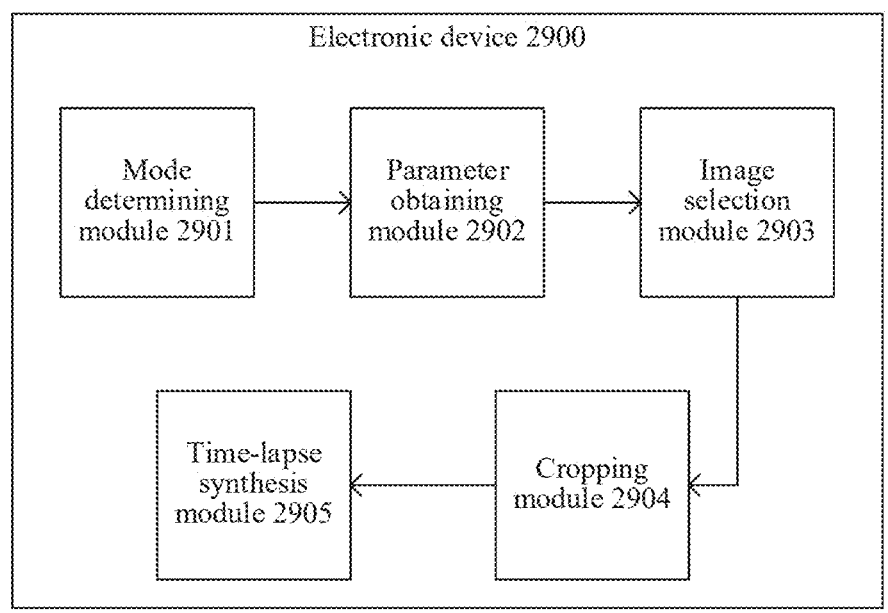
FIG. 29 is a schematic diagram of a structure according to an embodiment of this application.

For example, in a division manner, referring to FIG. 29, an electronic device 2900 includes a mode determining module 2901, a parameter obtaining module 2902, an image selection module 2903, a cropping module 2904, a time-lapse synthesis module 2905, and the like. The mode determining module is configured to determine, based on a selection of a user, to enter a movement submode, a zoom in/out submode, or another time-lapse photography mode. The parameter obtaining module is configured to obtain related parameters such as a size, a position, a target direction, and a target speed of a moving window in the movement submode. The parameter obtaining module is further configured to determine parameters such as an initial field of view range, a target field of view range, and a target speed in the zoom in/out submode. The image selection module is configured to calculate, in the movement submode or the zoom in/out submode, coordinates of four vertices of a target image on each frame of original image based on the parameters obtained by the parameter obtaining module, to determine, based on the coordinates of the vertices, a region in which the target image is located. The cropping module is configured to crop the original image, to retain pixels in a region of the target image. The time-lapse synthesis module is configured to add the target image obtained in a shooting process to a synthesis queue for synthesis, to generate a video image in a time-lapse photography video.

Embodiments of this application further provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the shooting method in the foregoing embodiments.

Embodiments of this application further provide a computer-readable storage medium. The computer-readable storage medium stores computer instructions. When the computer instructions are run on an electronic device, the electronic device is enabled to perform the related method steps, to implement the shooting method in the foregoing embodiments.

Embodiments of this application further provide a computer program product. When the computer program product is run on a computer, the computer is enabled to perform the foregoing related steps, to implement the shooting method performed by the electronic device in the foregoing embodiments.

In addition, embodiments of this application further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the shooting method performed by the electronic device in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in the form of hardware, or may be implemented in the form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    entering a time-lapse photography mode of a camera application;
    entering a first submode of the time-lapse photography mode in response to a first preset operation of a user;
    displaying, on a preview interface in the first submode, a preview image and a first window, wherein a size ratio of the first window is consistent with that of the preview image;
    performing, in response to a shooting operation of the user, shooting of time-lapse photography to generate recorded images that are based on a capture interval and the first window, wherein positions of the first window on different recorded images are different recorded;
    displaying, on a shooting interface, the recorded images;
    stopping the shooting of time-lapse photography after the first window reaches a boundary of a recorded image; and
    generating a time-lapse photography video comprising video images based on the recorded images.

2. The method of claim 1, wherein displaying the preview image and the first window on the preview interface further comprises displaying the first window on the preview interface in response to a second preset operation of the user.

3. The method of claim 1, wherein the preview interface comprises a plurality of direction controls, and wherein the method further comprises:
    detecting an operation of the user on a target direction control;
    determining a direction indicated by the target direction control as a target direction; and
    moving the first window in the target direction on adjacent recorded images.

4. The method of claim 3, wherein the preview interface comprises a moving speed adjustment control, and wherein the method further comprises:
    detecting an operation of the user on the moving speed adjustment control;
    determining a target speed corresponding to the moving speed adjustment control; and
    moving the first window in the target direction on the adjacent recorded images at the target speed.

5. The method of claim 4, wherein on a first recorded image in a shooting process, a horizontal coordinate of a first vertex of the first window is x1, wherein after the first window moves to the boundary of the recorded image in the target direction, the horizontal coordinate of the first vertex is x1e, wherein on an $m^{th}$ recorded image in the shooting process, the horizontal coordinate of the first vertex is x1m, and x1m=x1+(x1e−x1)*v*(m−1), wherein v represents the target speed, and wherein the target speed is a quantity of pixels that a vertex coordinate of the first window moves on two adjacent frames of the recorded image.

6. The method of claim 1, further comprising:
    detecting a play operation of the user; and
    displaying the video images in the time-lapse photography video on a play interface after the play operation is detected, wherein the video images comprise the recorded images, and wherein sizes of the video images are consistent with a size of the preview image.

7. A method, comprising:
    entering a time-lapse photography mode of a camera application;
    entering a second submode of the time-lapse photography mode in response to a third preset operation of a user;
    displaying a first preview image and first relative position information on a preview interface in the second submode, wherein the first relative position information comprises a relative position relationship among a start box, a target box, and a maximum range box, wherein the start box corresponds to a start field of view range, wherein the first preview image corresponds to the start field of view range, wherein the target box corresponds to a target field of view range, and wherein the maximum range box corresponds to a maximum field of view range;
    performing, in response to a shooting operation of the user, shooting of time-lapse photography to generate recorded images that are based on a capture interval;
    displaying, on a shooting interface, the recorded images;
    changing field of view ranges of different recorded images from the start field of view range to the target field of view range, wherein sizes of the recorded images are consistent with a size of the first preview image;
    stopping the shooting of time-lapse photography after a field of view range of a recorded image has changed to the target field of view range; and
    generating a time-lapse photography video comprising video images based on the recorded images.

8. The method of claim 7, wherein displaying the first relative position information on the preview interface comprises:
    displaying second relative position information on the preview interface, wherein the second relative position information comprises a relative position relationship between the start box and the maximum range box;
    adjusting a zoom ratio of the first preview image in response to a fourth preset operation of the user, wherein a field of view range that is on the preview interface and corresponds to a second preview image obtained after the adjustment is the target field of view range; and displaying the first relative position information on the preview interface.

9. The method of claim 7, wherein the preview interface comprises a zoom in/out speed adjustment control, and wherein the method further comprises:

detecting an operation of the user on the zoom in/out speed adjustment control;

determining a target speed corresponding to the zoom in/out speed adjustment control; and changing field of view ranges of different recorded images from the start field of view range to the target field of view range at the target speed.

10. The method of claim 9, wherein a horizontal coordinate of a first vertex on a first recorded image corresponding to the start field of view range in a shooting process is x1, wherein the horizontal coordinate of the first vertex of an image region corresponding to the target field of view range in the first recorded image is x1e, wherein the horizontal coordinate of the first vertex on an $m^{th}$ recorded image in the shooting process is x1m, wherein when an area of an image region corresponding to the start field of view range is S1 pixels and an area of the image region corresponding to the target field of view range is S2 pixels, x1m=x1+(x1e−x1)*c*(m−1), wherein c=(S2−S1)/v, wherein v represents the target speed, and wherein the target speed is a quantity of pixels that a coordinate of a same vertex moves on two adjacent frames of the recorded image.

11. The method of claim 7, wherein the shooting interface further comprises third relative position information, wherein the third relative position information comprises a relative position relationship among a recording box, the target box, and the maximum range box, and wherein the recording box corresponds to a field of view range of the recorded image.

12. The method of claim 7, further comprising:
detecting a play operation of the user; and
displaying the video images in the time-lapse photography video on a play interface after the play operation is detected, wherein the video images comprise the recorded images.

13. An electronic device, comprising:
a screen configured to display a preview interface;
a memory configured to store one or more computer programs comprising instructions; and
a processor coupled to the memory and the screen, wherein the processor is configured to execute the instructions and cause the electronic device to:
enter a time-lapse photography mode of a camera application;
enter a first submode of the time-lapse photography mode in response to a first preset operation of a user;
display a preview image and a first window on the preview interface in the first submode, wherein a size ratio of the first window is consistent with that of the preview image;
perform, in response to a shooting operation of the user, shooting of time-lapse photography to generate recorded images based on a capture interval and the first window, wherein positions of the first window on different recorded images are different;

display, on a shooting interface, the recorded images;
stop the shooting of time-lapse photography after the first window reaches a boundary of a recorded image; and
generate a time-lapse photography video comprising video images based on the recorded images.

14. The electronic device of claim 13, wherein displaying the preview image and the first window on the preview interface further comprises
displaying the first window on the preview interface in response to a second preset operation of the user.

15. The electronic device of claim 13, wherein the preview interface comprises a plurality of direction controls, and wherein the instructions, when executed by the processor, further cause the electronic device to:
detect an operation of the user on a target direction control;
determine a direction indicated by the target direction control as a target direction; and
move the first window in the target direction on adjacent recorded images.

16. The electronic device of claim 15, wherein the preview interface comprises a moving speed adjustment control, and wherein the instructions, when executed by the processor, further cause the electronic device to:
detect an operation of the user on the moving speed adjustment control;
determine a target speed corresponding to the moving speed adjustment control; and
move the first window in the target direction on the adjacent recorded images at the target speed.

17. The electronic device of claim 16, wherein on a first recorded image in a shooting process, a horizontal coordinate of a first vertex of the first window is x1, wherein after the first window moves to the boundary of the recorded image in the target direction, the horizontal coordinate of the first vertex is x1e, wherein on an $m^{th}$ recorded image in the shooting process, the horizontal coordinate of the first vertex is x1m, and x1m=x1+(x1e−x1)*v*(m−1), wherein v represents the target speed, and wherein the target speed is a quantity of pixels that a vertex coordinate of the first window moves on two adjacent frames of the recorded image.

18. The electronic device of claim 16, wherein the instructions, when executed by the processor, further cause the electronic device to move the first window according to an adjustment ratio, and wherein the adjustment ratio continuously adjusts a size of the first window during movement based on the target direction and the target speed.

19. The electronic device of claim 18, wherein the adjustment ratio continuously adjusting the size of the first window comprises the size of the first window continuously increasing or decreasing on two adjacent frames of an original image in a shooting process based on the adjustment ratio.

20. The electronic device of claim 13, wherein the instructions, when executed by the processor, further cause the electronic device to:
detect a play operation of the user; and
display the video images in the time-lapse photography video on a play interface after the play operation is detected, wherein the video images comprise the recorded images, and wherein sizes of the video images are consistent with a size of the preview image.

* * * * *